(12) United States Patent
Martinez et al.

(10) Patent No.: US 11,613,078 B2
(45) Date of Patent: Mar. 28, 2023

(54) APPARATUS AND METHODS FOR ADDITIVELY MANUFACTURING ADHESIVE INLET AND OUTLET PORTS

(71) Applicant: DIVERGENT TECHNOLOGIES, INC., Los Angeles, CA (US)

(72) Inventors: Antonio Bernerd Martinez, El Segundo, CA (US); Muhammad Faizan Zafar, Long Beach, CA (US); Chukwubuikem Marcel Okoli, Los Angeles, CA (US); William David Kreig, Huntington Beach, CA (US); Roy Smith, Escondido, CA (US); David Brian TenHouten, Los Angeles, CA (US)

(73) Assignee: DIVERGENT TECHNOLOGIES, INC., Los Angeles, CA (US)

( * ) Notice: Subject to any disclaimer, the term of this patent is extended or adjusted under 35 U.S.C. 154(b) by 336 days.

(21) Appl. No.: 15/959,036

(22) Filed: Apr. 20, 2018

(65) Prior Publication Data
US 2019/0322040 A1   Oct. 24, 2019

(51) Int. Cl.
*B29C 64/209* (2017.01)
*B29C 64/379* (2017.01)
(Continued)

(52) U.S. Cl.
CPC .......... *B29C 64/209* (2017.08); *B29C 64/106* (2017.08); *B29C 64/379* (2017.08);
(Continued)

(58) Field of Classification Search
None
See application file for complete search history.

(56) References Cited

U.S. PATENT DOCUMENTS

| | | | | |
|---|---|---|---|---|
| 3,343,564 A | * | 9/1967 | Peeples | F16K 15/044 137/539 |
| 4,249,568 A | * | 2/1981 | Duggan | E03C 1/104 137/107 |

(Continued)

FOREIGN PATENT DOCUMENTS

| | | |
|---|---|---|
| CN | 202515386 U  * | 11/2012 |
| WO | 1996036455 A1 | 11/1996 |

(Continued)

OTHER PUBLICATIONS

US 9,202,136 B2, 12/2015, Schmidt et al. (withdrawn)
(Continued)

*Primary Examiner* — Jacob T Minskey
*Assistant Examiner* — Adrianna N Konves
(74) *Attorney, Agent, or Firm* — ArentFox Schiff LLP

(57) ABSTRACT

Apparatus and methods for additively manufacturing adhesive inlet and outlet ports are presented herein. Adhesive inlet and outlet ports are additively manufactured to include additively manufactured (AM) valves for reducing and/or eliminating sealant leakage and backflow. Robot end effectors are tailored to interface with the AM inlet and outlet ports and to provide an adhesive source and/or a vacuum source. AM inlet and outlet ports enable robust, lightweight, multi-material AM parts connected via adhesive joining.

14 Claims, 18 Drawing Sheets

(51) Int. Cl.
*B29C 64/106* (2017.01)
*B33Y 80/00* (2015.01)
*B33Y 10/00* (2015.01)
*B33Y 30/00* (2015.01)

(52) U.S. Cl.
CPC .............. *B33Y 10/00* (2014.12); *B33Y 30/00* (2014.12); *B33Y 80/00* (2014.12)

(56) References Cited

U.S. PATENT DOCUMENTS

| | | | |
|---|---|---|---|
| 4,622,085 A * | 11/1986 | Yamada | E04G 23/0203 |
| | | | 141/1 |
| 5,203,226 A | 4/1993 | Hongou et al. | |
| 5,742,385 A | 4/1998 | Champa | |
| 5,990,444 A | 11/1999 | Costin | |
| 6,010,155 A | 1/2000 | Rinehart | |
| 6,096,249 A | 8/2000 | Yamaguchi | |
| 6,140,602 A | 10/2000 | Costin | |
| 6,250,533 B1 | 6/2001 | Otterbein et al. | |
| 6,252,196 B1 | 6/2001 | Costin et al. | |
| 6,318,642 B1 | 11/2001 | Goenka et al. | |
| 6,365,057 B1 | 4/2002 | Whitehurst et al. | |
| 6,391,251 B1 | 5/2002 | Keicher et al. | |
| 6,409,930 B1 | 6/2002 | Whitehurst et al. | |
| 6,468,439 B1 | 10/2002 | Whitehurst et al. | |
| 6,554,345 B2 | 4/2003 | Jonsson | |
| 6,585,151 B1 | 7/2003 | Ghosh | |
| 6,644,721 B1 | 11/2003 | Miskech et al. | |
| 6,811,744 B2 | 11/2004 | Keicher et al. | |
| 6,866,497 B2 | 3/2005 | Saiki | |
| 6,919,035 B1 | 7/2005 | Clough | |
| 6,926,970 B2 | 8/2005 | James et al. | |
| 7,152,292 B2 | 12/2006 | Hohmann et al. | |
| 7,344,186 B1 | 3/2008 | Hausler et al. | |
| 7,500,373 B2 | 3/2009 | Quell | |
| 7,586,062 B2 | 9/2009 | Heberer | |
| 7,637,134 B2 | 12/2009 | Burzlaff et al. | |
| 7,710,347 B2 | 5/2010 | Gentilman et al. | |
| 7,716,802 B2 | 5/2010 | Stern et al. | |
| 7,745,293 B2 | 6/2010 | Yamazaki et al. | |
| 7,766,123 B2 | 8/2010 | Sakurai et al. | |
| 7,852,388 B2 | 12/2010 | Shimizu et al. | |
| 7,908,922 B2 | 3/2011 | Zarabadi et al. | |
| 7,951,324 B2 | 5/2011 | Naruse et al. | |
| 8,094,036 B2 | 1/2012 | Heberer | |
| 8,163,077 B2 | 4/2012 | Eron et al. | |
| 8,286,236 B2 | 10/2012 | Jung et al. | |
| 8,289,352 B2 | 10/2012 | Vartanian et al. | |
| 8,297,096 B2 | 10/2012 | Mizumura et al. | |
| 8,354,170 B1 | 1/2013 | Henry et al. | |
| 8,383,028 B2 | 2/2013 | Lyons | |
| 8,408,036 B2 | 4/2013 | Reith et al. | |
| 8,429,754 B2 | 4/2013 | Jung et al. | |
| 8,437,513 B1 | 5/2013 | Derakhshani et al. | |
| 8,444,903 B2 | 5/2013 | Lyons et al. | |
| 8,452,073 B2 | 5/2013 | Taminger et al. | |
| 8,599,301 B2 | 12/2013 | Dowski, Jr. et al. | |
| 8,606,540 B2 | 12/2013 | Haisty et al. | |
| 8,610,761 B2 | 12/2013 | Haisty et al. | |
| 8,631,996 B2 | 1/2014 | Quell et al. | |
| 8,675,925 B2 | 3/2014 | Derakhshani et al. | |
| 8,678,060 B2 | 3/2014 | Dietz et al. | |
| 8,686,314 B2 | 4/2014 | Schneegans et al. | |
| 8,686,997 B2 | 4/2014 | Radet et al. | |
| 8,694,284 B2 | 4/2014 | Berard | |
| 8,720,876 B2 | 5/2014 | Reith et al. | |
| 8,752,166 B2 | 6/2014 | Jung et al. | |
| 8,755,923 B2 | 6/2014 | Farahani et al. | |
| 8,787,628 B1 | 7/2014 | Derakhshani et al. | |
| 8,818,771 B2 | 8/2014 | Gielis et al. | |
| 8,873,238 B2 | 10/2014 | Wilkins | |
| 8,978,535 B2 | 3/2015 | Ortiz et al. | |
| 9,006,605 B2 | 4/2015 | Schneegans et al. | |
| 9,071,436 B2 | 6/2015 | Jung et al. | |
| 9,101,979 B2 | 8/2015 | Hofmann et al. | |
| 9,104,921 B2 | 8/2015 | Derakhshani et al. | |
| 9,126,365 B1 | 9/2015 | Mark et al. | |
| 9,128,476 B2 | 9/2015 | Jung et al. | |
| 9,138,924 B2 | 9/2015 | Yen | |
| 9,149,988 B2 | 10/2015 | Mark et al. | |
| 9,156,205 B2 | 10/2015 | Mark et al. | |
| 9,186,848 B2 | 11/2015 | Mark et al. | |
| 9,244,986 B2 | 1/2016 | Karmarkar | |
| 9,248,611 B2 | 2/2016 | Divine et al. | |
| 9,254,535 B2 | 2/2016 | Buller et al. | |
| 9,266,566 B2 | 2/2016 | Kim | |
| 9,269,022 B2 | 2/2016 | Rhoads et al. | |
| 9,327,452 B2 | 5/2016 | Mark et al. | |
| 9,329,020 B1 | 5/2016 | Napoletano | |
| 9,332,251 B2 | 5/2016 | Haisty et al. | |
| 9,346,127 B2 | 5/2016 | Buller et al. | |
| 9,389,315 B2 | 7/2016 | Bruder et al. | |
| 9,399,256 B2 | 7/2016 | Buller et al. | |
| 9,403,235 B2 | 8/2016 | Buller et al. | |
| 9,418,193 B2 | 8/2016 | Dowski, Jr. et al. | |
| 9,457,514 B2 | 10/2016 | Schwärzler | |
| 9,469,057 B2 | 10/2016 | Johnson et al. | |
| 9,478,063 B2 | 10/2016 | Rhoads et al. | |
| 9,481,402 B1 | 11/2016 | Muto et al. | |
| 9,486,878 B2 | 11/2016 | Buller et al. | |
| 9,486,960 B2 | 11/2016 | Paschkewitz et al. | |
| 9,502,993 B2 | 11/2016 | Deng | |
| 9,525,262 B2 | 12/2016 | Stuart et al. | |
| 9,533,526 B1 | 1/2017 | Nevins | |
| 9,555,315 B2 | 1/2017 | Aders | |
| 9,555,580 B1 | 1/2017 | Dykstra et al. | |
| 9,557,856 B2 | 1/2017 | Send et al. | |
| 9,566,742 B2 | 2/2017 | Keating et al. | |
| 9,566,758 B2 | 2/2017 | Cheung et al. | |
| 9,573,193 B2 | 2/2017 | Buller et al. | |
| 9,573,225 B2 | 2/2017 | Buller et al. | |
| 9,586,290 B2 | 3/2017 | Buller et al. | |
| 9,595,795 B2 | 3/2017 | Lane et al. | |
| 9,597,843 B2 | 3/2017 | Stauffer et al. | |
| 9,600,929 B1 | 3/2017 | Young et al. | |
| 9,609,755 B2 | 3/2017 | Coull et al. | |
| 9,610,737 B2 | 4/2017 | Johnson et al. | |
| 9,611,667 B2 | 4/2017 | GangaRao et al. | |
| 9,616,623 B2 | 4/2017 | Johnson et al. | |
| 9,626,487 B2 | 4/2017 | Jung et al. | |
| 9,626,489 B2 | 4/2017 | Nilsson | |
| 9,643,361 B2 | 5/2017 | Liu | |
| 9,662,840 B1 | 5/2017 | Buller et al. | |
| 9,665,182 B2 | 5/2017 | Send et al. | |
| 9,672,389 B1 | 6/2017 | Mosterman et al. | |
| 9,672,550 B2 | 6/2017 | Apsley et al. | |
| 9,676,145 B2 | 6/2017 | Buller et al. | |
| 9,684,919 B2 | 6/2017 | Apsley et al. | |
| 9,688,032 B2 | 6/2017 | Kia et al. | |
| 9,690,286 B2 | 6/2017 | Hovsepian et al. | |
| 9,700,966 B2 | 7/2017 | Kraft et al. | |
| 9,703,896 B2 | 7/2017 | Zhang et al. | |
| 9,713,903 B2 | 7/2017 | Paschkewitz et al. | |
| 9,718,302 B2 | 8/2017 | Young et al. | |
| 9,718,434 B2 | 8/2017 | Hector, Jr. et al. | |
| 9,724,877 B2 | 8/2017 | Flitsch et al. | |
| 9,724,881 B2 | 8/2017 | Johnson et al. | |
| 9,725,178 B2 | 8/2017 | Wang | |
| 9,731,730 B2 | 8/2017 | Stiles | |
| 9,731,773 B2 | 8/2017 | Gami et al. | |
| 9,741,954 B2 | 8/2017 | Bruder et al. | |
| 9,747,352 B2 | 8/2017 | Karmarkar | |
| 9,764,415 B2 | 9/2017 | Seufzer et al. | |
| 9,764,520 B2 | 9/2017 | Johnson et al. | |
| 9,765,226 B2 | 9/2017 | Dain | |
| 9,770,760 B2 | 9/2017 | Liu | |
| 9,773,393 B2 | 9/2017 | Velez | |
| 9,776,234 B2 | 10/2017 | Schaafhausen et al. | |
| 9,782,936 B2 | 10/2017 | Glunz et al. | |
| 9,783,324 B2 | 10/2017 | Embler et al. | |
| 9,783,977 B2 | 10/2017 | Alqasimi et al. | |
| 9,789,548 B2 | 10/2017 | Golshany et al. | |
| 9,789,922 B2 | 10/2017 | Dosenbach et al. | |

(56) References Cited

U.S. PATENT DOCUMENTS

| | | |
|---|---|---|
| 9,796,137 B2 | 10/2017 | Zhang et al. |
| 9,802,108 B2 | 10/2017 | Aders |
| 9,809,977 B2 | 11/2017 | Carney et al. |
| 9,817,922 B2 | 11/2017 | Glunz et al. |
| 9,818,071 B2 | 11/2017 | Jung et al. |
| 9,821,339 B2 | 11/2017 | Paschkewitz et al. |
| 9,821,411 B2 | 11/2017 | Buller et al. |
| 9,823,143 B2 | 11/2017 | Twelves, Jr. et al. |
| 9,829,564 B2 | 11/2017 | Bruder et al. |
| 9,846,933 B2 | 12/2017 | Yuksel |
| 9,854,828 B2 | 1/2018 | Langeland |
| 9,858,604 B2 | 1/2018 | Apsley et al. |
| 9,862,833 B2 | 1/2018 | Hasegawa et al. |
| 9,862,834 B2 | 1/2018 | Hasegawa et al. |
| 9,863,885 B2 | 1/2018 | Zaretski et al. |
| 9,870,629 B2 | 1/2018 | Cardno et al. |
| 9,879,981 B1 | 1/2018 | Dehghan Niri et al. |
| 9,884,663 B2 | 2/2018 | Czinger et al. |
| 9,898,776 B2 | 2/2018 | Apsley et al. |
| 9,914,150 B2 | 3/2018 | Pettersson et al. |
| 9,919,360 B2 | 3/2018 | Buller et al. |
| 9,931,697 B2 | 4/2018 | Levin et al. |
| 9,933,031 B2 | 4/2018 | Bracamonte et al. |
| 9,933,092 B2 | 4/2018 | Sindelar |
| 9,957,031 B2 | 5/2018 | Golshany et al. |
| 9,958,535 B2 | 5/2018 | Send et al. |
| 9,962,767 B2 | 5/2018 | Buller et al. |
| 9,963,978 B2 | 5/2018 | Johnson et al. |
| 9,971,920 B2 | 5/2018 | Derakhshani et al. |
| 9,976,063 B2 | 5/2018 | Childers et al. |
| 9,987,792 B2 | 6/2018 | Flitsch et al. |
| 9,988,136 B2 | 6/2018 | Tiryaki et al. |
| 9,989,623 B2 | 6/2018 | Send et al. |
| 9,990,565 B2 | 6/2018 | Rhoads et al. |
| 9,994,339 B2 | 6/2018 | Colson et al. |
| 9,996,890 B1 | 6/2018 | Cinnamon et al. |
| 9,996,945 B1 | 6/2018 | Holzer et al. |
| 10,002,215 B2 | 6/2018 | Dowski et al. |
| 10,006,156 B2 | 6/2018 | Kirkpatrick |
| 10,011,089 B2 | 7/2018 | Lyons et al. |
| 10,011,685 B2 | 7/2018 | Childers et al. |
| 10,012,532 B2 | 7/2018 | Send et al. |
| 10,013,777 B2 | 7/2018 | Mariampillai et al. |
| 10,015,908 B2 | 7/2018 | Williams et al. |
| 10,016,852 B2 | 7/2018 | Broda |
| 10,016,942 B2 | 7/2018 | Mark et al. |
| 10,017,384 B1 | 7/2018 | Greer et al. |
| 10,018,576 B2 | 7/2018 | Herbsommer et al. |
| 10,022,792 B2 | 7/2018 | Srivas et al. |
| 10,022,912 B2 | 7/2018 | Kia et al. |
| 10,027,376 B2 | 7/2018 | Sankaran et al. |
| 10,029,415 B2 | 7/2018 | Swanson et al. |
| 10,040,239 B2 | 8/2018 | Brown, Jr. |
| 10,046,412 B2 | 8/2018 | Blackmore |
| 10,048,769 B2 | 8/2018 | Selker et al. |
| 10,052,712 B2 | 8/2018 | Blackmore |
| 10,052,820 B2 | 8/2018 | Kemmer et al. |
| 10,055,536 B2 | 8/2018 | Maes et al. |
| 10,058,764 B2 | 8/2018 | Aders |
| 10,058,920 B2 | 8/2018 | Buller et al. |
| 10,061,906 B2 | 8/2018 | Nilsson |
| 10,065,270 B2 | 9/2018 | Buller et al. |
| 10,065,361 B2 | 9/2018 | Susnjara et al. |
| 10,065,367 B2 | 9/2018 | Brown, Jr. |
| 10,068,316 B1 | 9/2018 | Holzer et al. |
| 10,071,422 B2 | 9/2018 | Buller et al. |
| 10,071,525 B2 | 9/2018 | Susnjara et al. |
| 10,072,179 B2 | 9/2018 | Drijfhout |
| 10,074,128 B2 | 9/2018 | Colson et al. |
| 10,076,875 B2 | 9/2018 | Mark et al. |
| 10,076,876 B2 | 9/2018 | Mark et al. |
| 10,081,140 B2 | 9/2018 | Paesano et al. |
| 10,081,431 B2 | 9/2018 | Seack et al. |
| 10,086,568 B2 | 10/2018 | Snyder et al. |
| 10,087,320 B2 | 10/2018 | Simmons et al. |
| 10,087,556 B2 | 10/2018 | Gallucci et al. |
| 10,099,427 B2 | 10/2018 | Mark et al. |
| 10,100,542 B2 | 10/2018 | GangaRao et al. |
| 10,100,890 B2 | 10/2018 | Bracamonte et al. |
| 10,107,344 B2 | 10/2018 | Bracamonte et al. |
| 10,108,766 B2 | 10/2018 | Druckman et al. |
| 10,113,600 B2 | 10/2018 | Bracamonte et al. |
| 10,118,347 B2 | 11/2018 | Stauffer et al. |
| 10,118,579 B2 | 11/2018 | Lakic |
| 10,120,078 B2 | 11/2018 | Bruder et al. |
| 10,124,546 B2 | 11/2018 | Johnson et al. |
| 10,124,570 B2 | 11/2018 | Evans et al. |
| 10,137,500 B2 | 11/2018 | Blackmore |
| 10,138,354 B2 | 11/2018 | Groos et al. |
| 10,144,126 B2 | 12/2018 | Krohne et al. |
| 10,145,110 B2 | 12/2018 | Carney et al. |
| 10,151,363 B2 | 12/2018 | Bracamonte et al. |
| 10,152,661 B2 | 12/2018 | Kieser |
| 10,160,278 B2 | 12/2018 | Coombs et al. |
| 10,161,021 B2 | 12/2018 | Lin et al. |
| 10,166,752 B2 | 1/2019 | Evans et al. |
| 10,166,753 B2 | 1/2019 | Evans et al. |
| 10,171,578 B1 | 1/2019 | Cook et al. |
| 10,173,255 B2 | 1/2019 | TenHouten et al. |
| 10,173,327 B2 | 1/2019 | Kraft et al. |
| 10,178,800 B2 | 1/2019 | Mahalingam et al. |
| 10,179,640 B2 | 1/2019 | Wilkerson |
| 10,183,330 B2 | 1/2019 | Buller et al. |
| 10,183,478 B2 | 1/2019 | Evans et al. |
| 10,189,187 B2 | 1/2019 | Keating et al. |
| 10,189,240 B2 | 1/2019 | Evans et al. |
| 10,189,241 B2 | 1/2019 | Evans et al. |
| 10,189,242 B2 | 1/2019 | Evans et al. |
| 10,190,424 B2 | 1/2019 | Johnson et al. |
| 10,195,693 B2 | 2/2019 | Buller et al. |
| 10,196,539 B2 | 2/2019 | Boonen et al. |
| 10,197,338 B2 | 2/2019 | Melsheimer |
| 10,200,677 B2 | 2/2019 | Trevor et al. |
| 10,201,932 B2 | 2/2019 | Flitsch et al. |
| 10,201,941 B2 | 2/2019 | Evans et al. |
| 10,202,673 B2 | 2/2019 | Lin et al. |
| 10,204,216 B2 | 2/2019 | Nejati et al. |
| 10,207,454 B2 | 2/2019 | Buller et al. |
| 10,209,065 B2 | 2/2019 | Estevo, Jr. et al. |
| 10,210,662 B2 | 2/2019 | Holzer et al. |
| 10,213,837 B2 | 2/2019 | Kondoh |
| 10,214,248 B2 | 2/2019 | Hall et al. |
| 10,214,252 B2 | 2/2019 | Schellekens et al. |
| 10,214,275 B2 | 2/2019 | Goehlich |
| 10,220,575 B2 | 3/2019 | Reznar |
| 10,220,881 B2 | 3/2019 | Tyan et al. |
| 10,221,530 B2 | 3/2019 | Driskell et al. |
| 10,226,900 B1 | 3/2019 | Nevins |
| 10,232,550 B2 | 3/2019 | Evans et al. |
| 10,234,342 B2 | 3/2019 | Moorlag et al. |
| 10,237,477 B2 | 3/2019 | Trevor et al. |
| 10,252,335 B2 | 4/2019 | Buller et al. |
| 10,252,336 B2 | 4/2019 | Buller et al. |
| 10,254,499 B1 | 4/2019 | Cohen et al. |
| 10,257,499 B2 | 4/2019 | Hintz et al. |
| 10,259,044 B2 | 4/2019 | Buller et al. |
| 10,268,181 B1 | 4/2019 | Nevins |
| 10,269,225 B2 | 4/2019 | Velez |
| 10,272,860 B2 | 4/2019 | Mohapatra et al. |
| 10,272,862 B2 | 4/2019 | Whitehead |
| 10,275,564 B2 | 4/2019 | Ridgeway et al. |
| 10,279,580 B2 | 5/2019 | Evans et al. |
| 10,285,219 B2 | 5/2019 | Fetfatsidis et al. |
| 10,286,452 B2 | 5/2019 | Buller et al. |
| 10,286,603 B2 | 5/2019 | Buller et al. |
| 10,286,961 B2 | 5/2019 | Hillebrecht et al. |
| 10,289,263 B2 | 5/2019 | Troy et al. |
| 10,289,875 B2 | 5/2019 | Singh et al. |
| 10,291,193 B2 | 5/2019 | Dandu et al. |
| 10,294,552 B2 | 5/2019 | Liu et al. |
| 10,294,982 B2 | 5/2019 | Gabrys et al. |
| 10,295,989 B1 | 5/2019 | Nevins |
| 10,303,159 B2 | 5/2019 | Czinger et al. |
| 10,307,824 B2 | 6/2019 | Kondoh |

(56) References Cited

U.S. PATENT DOCUMENTS

| | | |
|---|---|---|
| 10,310,197 B1 | 6/2019 | Droz et al. |
| 10,313,651 B2 | 6/2019 | Trevor et al. |
| 10,315,252 B2 | 6/2019 | Mendelsberg et al. |
| 10,336,050 B2 | 7/2019 | Susnjara |
| 10,337,542 B2 | 7/2019 | Hesslewood et al. |
| 10,337,952 B2 | 7/2019 | Bosetti et al. |
| 10,339,266 B2 | 7/2019 | Urick et al. |
| 10,343,330 B2 | 7/2019 | Evans et al. |
| 10,343,331 B2 | 7/2019 | McCall et al. |
| 10,343,355 B2 | 7/2019 | Evans et al. |
| 10,343,724 B2 | 7/2019 | Polewarczyk et al. |
| 10,343,725 B2 | 7/2019 | Martin et al. |
| 10,350,823 B2 | 7/2019 | Rolland et al. |
| 10,356,341 B2 | 7/2019 | Holzer et al. |
| 10,356,395 B2 | 7/2019 | Holzer et al. |
| 10,357,829 B2 | 7/2019 | Spink et al. |
| 10,357,957 B2 | 7/2019 | Buller et al. |
| 10,359,756 B2 | 7/2019 | Newell et al. |
| 10,369,629 B2 | 8/2019 | Mendelsberg et al. |
| 10,382,739 B1 | 8/2019 | Rusu et al. |
| 10,384,393 B2 | 8/2019 | Xu et al. |
| 10,384,416 B2 | 8/2019 | Cheung et al. |
| 10,389,410 B2 | 8/2019 | Brooks et al. |
| 10,391,710 B2 | 8/2019 | Mondesir |
| 10,392,097 B2 | 8/2019 | Pham et al. |
| 10,392,131 B2 | 8/2019 | Deck et al. |
| 10,393,315 B2 | 8/2019 | Tyan |
| 10,400,080 B2 | 9/2019 | Ramakrishnan et al. |
| 10,401,832 B2 | 9/2019 | Snyder et al. |
| 10,403,009 B2 | 9/2019 | Mariampillai et al. |
| 10,406,750 B2 | 9/2019 | Barton et al. |
| 10,412,283 B2 | 9/2019 | Send et al. |
| 10,416,095 B2 | 9/2019 | Herbsommer et al. |
| 10,421,496 B2 | 9/2019 | Swayne et al. |
| 10,421,863 B2 | 9/2019 | Hasegawa et al. |
| 10,422,478 B2 | 9/2019 | Leachman et al. |
| 10,425,793 B2 | 9/2019 | Sankaran et al. |
| 10,427,364 B2 | 10/2019 | Alves |
| 10,429,006 B2 | 10/2019 | Tyan et al. |
| 10,434,573 B2 | 10/2019 | Buller et al. |
| 10,435,185 B2 | 10/2019 | Divine et al. |
| 10,435,773 B2 | 10/2019 | Liu et al. |
| 10,436,038 B2 | 10/2019 | Buhler et al. |
| 10,438,407 B2 | 10/2019 | Pavanaskar et al. |
| 10,440,351 B2 | 10/2019 | Holzer et al. |
| 10,442,002 B2 | 10/2019 | Benthien et al. |
| 10,442,003 B2 | 10/2019 | Symeonidis et al. |
| 10,449,696 B2 | 10/2019 | Elgar et al. |
| 10,449,737 B2 | 10/2019 | Johnson et al. |
| 10,461,810 B2 | 10/2019 | Cook et al. |
| 2002/0036675 A1* | 3/2002 | Yoshihira ............... B41J 2/1601 347/56 |
| 2004/0218990 A1* | 11/2004 | Stevenson ............... F16B 3/005 411/82 |
| 2006/0108783 A1 | 5/2006 | Ni et al. |
| 2009/0013875 A1* | 1/2009 | Widanagamage Don ........ A47J 31/52 99/280 |
| 2014/0277669 A1 | 9/2014 | Nardi et al. |
| 2016/0016229 A1* | 1/2016 | Czinger ............... B62D 27/023 296/205 |
| 2017/0113344 A1 | 4/2017 | Schönberg |
| 2017/0341309 A1 | 11/2017 | Piepenbrock et al. |
| 2018/0281204 A1* | 10/2018 | Fromm ................. B25J 15/024 |
| 2019/0111795 A1* | 4/2019 | Rhodes ................. E05F 15/603 |
| 2019/0247922 A1* | 8/2019 | Poole ..................... B22F 7/06 |

FOREIGN PATENT DOCUMENTS

| | | |
|---|---|---|
| WO | 1996036525 A1 | 11/1996 |
| WO | 1996038260 A1 | 12/1996 |
| WO | 2003024641 A1 | 3/2003 |
| WO | 2004108343 A1 | 12/2004 |
| WO | 2005093773 A1 | 10/2005 |
| WO | 2007003375 A1 | 1/2007 |
| WO | 2007110235 A1 | 10/2007 |
| WO | 2007110236 A1 | 10/2007 |
| WO | 2008019847 A1 | 2/2008 |
| WO | 2007128586 A3 | 6/2008 |
| WO | 2008068314 A2 | 6/2008 |
| WO | 2008086994 A1 | 7/2008 |
| WO | 2008087024 A1 | 7/2008 |
| WO | 2008107130 A1 | 9/2008 |
| WO | 2008138503 A1 | 11/2008 |
| WO | 2008145396 A1 | 12/2008 |
| WO | 2009083609 A2 | 7/2009 |
| WO | 2009098285 A1 | 8/2009 |
| WO | 2009112520 A1 | 9/2009 |
| WO | 2009135938 A1 | 11/2009 |
| WO | 2009140977 A1 | 11/2009 |
| WO | 2010125057 A2 | 11/2010 |
| WO | 2010125058 A1 | 11/2010 |
| WO | 2010142703 A2 | 12/2010 |
| WO | 2011032533 A1 | 3/2011 |
| WO | 2014016437 A1 | 1/2014 |
| WO | 2014187720 A1 | 11/2014 |
| WO | 2014195340 A1 | 12/2014 |
| WO | 2015193331 A1 | 12/2015 |
| WO | 2016116414 A1 | 7/2016 |
| WO | 2017036461 A1 | 3/2017 |
| WO | 2019030248 A1 | 2/2019 |
| WO | 2019042504 A1 | 3/2019 |
| WO | 2019048010 A1 | 3/2019 |
| WO | 2019048498 A1 | 3/2019 |
| WO | 2019048680 A1 | 3/2019 |
| WO | 2019048682 A1 | 3/2019 |

OTHER PUBLICATIONS

US 9,809,265 B2, 11/2017, Kinjo (withdrawn)
US 10,449,880 B2, 10/2019, Mizobata et al. (withdrawn)
Marlin Steel, 3D Printing vs Traditional Manufacturing, Dec. 7, 2015, Accessed Jun. 2, 2020. (Year: 2015).*
Machine English translation of CN-202515386-U (Year: 2012).*

* cited by examiner

APPARATUS AND METHODS FOR ADDITIVELY MANUFACTURING ADHESIVE INLET AND OUTLET PORTS

BACKGROUND

Field

The present disclosure relates generally to techniques for manufacturing inlet and outlet ports, and more specifically to additively manufacturing adhesive inlet and outlet ports.

Background

Recently three-dimensional (3D) printing, also referred to as additive manufacturing, has presented new opportunities to efficiently build parts for automobiles and other transport structures such as airplanes, boats, motorcycles, and the like. Applying additive manufacturing processes to industries that produce these products and similar mechanized assemblies has proven to produce a structurally more efficient product. An automobile produced using 3D printed components can be made stronger and lighter, and consequently, more fuel efficient. Advantageously, 3D printing, as compared to traditional manufacturing processes, does not significantly contribute to the burning of fossil fuels; therefore, the 3D printing of parts for automobiles can be more eco-friendly than conventional manufacturing techniques.

Automobiles and transport vehicles are constructed with components including panels, extrusions, nodes, and tubes. Accordingly, there is a need to develop inlet and outlet port technologies for facilitating the joining of additively manufactured (AM) parts and components.

SUMMARY

Several aspects of techniques for additively manufacturing adhesive inlet and outlet ports, will be described more fully hereinafter with reference to three-dimensional (3D) printing techniques.

In one aspect, an apparatus comprises an additively manufactured (AM) inlet port and an AM outlet port. The AM inlet port is configured to receive an adhesive. The AM outlet port comprises an AM outlet adhesive valve configured to impede an adhesive outflow at the AM outlet port.

The adhesive flow can be unidirectional from the AM inlet port to the AM outlet port.

The AM outlet adhesive valve can comprise a lattice configured to impede the adhesive outflow at the AM outlet port.

The AM outlet port can be configured to receive a vacuum. The AM outlet adhesive valve can be configured to facilitate the adhesive flow from the AM inlet port to the AM outlet port by facilitating the vacuum.

The AM outlet adhesive valve can comprise a lattice configured to facilitate the vacuum by passing air and to impede the adhesive outflow at the AM outlet port. The AM outlet adhesive valve can comprise a plurality of outlet spring loaded tangs. The plurality of outlet spring loaded tangs can be configured to couple with a vacuum effector, to facilitate the vacuum when coupled with the vacuum effector, and to impede the adhesive outflow at the AM outlet port when decoupled from the vacuum effector.

The AM outlet adhesive valve can comprise a gap region and an AM ball. The AM ball can be configured to facilitate the vacuum by passing air through the gap region and to impede the adhesive outflow at the AM outlet port by blocking the gap region when the adhesive reaches the gap region. The AM outlet adhesive valve can further comprise a spring positioned to provide support to the AM ball.

The AM outlet adhesive valve can comprise a flap configured to facilitate the vacuum by passing air and to impede the adhesive outflow at the AM outlet port by blocking the outlet port when the adhesive reaches the outlet port. The flap can be configured to lock into place upon completion of an adhesive fill within the apparatus.

The AM inlet port can comprise an AM inlet adhesive valve configured to facilitate the adhesive flow from the AM inlet port to the AM outlet port and to impede an adhesive outflow at the AM inlet port. The AM inlet adhesive valve can comprise a lattice configured to impede the adhesive outflow at the AM inlet port.

The AM inlet adhesive valve can comprise a plurality of inlet spring loaded tangs configured to couple with an adhesive effector, to facilitate the adhesive flow from the AM inlet port to the AM outlet port when coupled with the adhesive effector, and to impede the adhesive outflow at the AM inlet port when decoupled from the adhesive effector.

The AM inlet adhesive valve can comprise a flap configured to facilitate the adhesive flow from the AM inlet port to the AM outlet port when the adhesive is applied at the inlet port and to impede the adhesive outflow at the AM inlet port by blocking the inlet port when the adhesive is removed from the inlet port. The flap can be configured to lock into place upon completion of an adhesive fill within the apparatus.

In another aspect, an apparatus comprises an AM effector for applying adhesive to an AM adhesive port. The AM effector comprises a first channel and a second channel. The first channel supports a seal plug, and the second channel is coupled to the first channel and configured to provide an adhesive to the AM adhesive port. The AM adhesive port can comprise an AM plug acceptor co-printed with the AM effector.

In another aspect, a method of manufacturing an AM node comprises: additively manufacturing an AM inlet port and additively manufacturing an AM outlet port. The AM inlet port is configured to receive an adhesive. The AM outlet port comprises an AM outlet adhesive valve configured to facilitate an adhesive flow from the AM inlet port to the AM outlet port and to impede an adhesive outflow at the AM outlet port.

The adhesive flow can be unidirectional from the AM inlet port to the AM outlet port.

Additively manufacturing the AM outlet port to comprise an AM outlet adhesive valve can further comprise additively manufacturing a lattice within the AM outlet adhesive valve. The lattice can be configured to impede the adhesive outflow at the AM outlet port.

The AM outlet port can be configured to receive a vacuum. The AM outlet adhesive valve can be configured to facilitate the unidirectional adhesive flow from the AM inlet port to the AM outlet port by facilitating the vacuum. Additively manufacturing the AM outlet port can comprise additively manufacturing a lattice within the AM outlet adhesive valve. The lattice can be configured to facilitate the vacuum by passing air and to impede the adhesive outflow at the AM outlet port.

Additively manufacturing the AM outlet port can comprise: additively manufacturing a plurality of outlet spring loaded tangs. The outlet spring loaded tangs can be configured to couple with a vacuum effector, to facilitate the vacuum when coupled with the vacuum effector, and to impede the adhesive outflow at the AM outlet port when decoupled from the vacuum effector.

Additively manufacturing the AM outlet port can comprise: additively manufacturing a gap region and additively manufacturing an AM ball. The AM ball can be configured to facilitate the vacuum by passing air through the gap region and to impede the adhesive outflow at the AM outlet port by blocking the gap region when the adhesive reaches the gap region.

Additively manufacturing the AM outlet port can further comprise additively manufacturing a spring positioned to provide support to the AM ball.

Additively manufacturing the AM outlet port can comprise additively manufacturing a flap. The flap can be configured to facilitate the vacuum by passing air and to impede the adhesive outflow at the AM outlet port by blocking the outlet port when the adhesive reaches the outlet port. The flap can be configured to lock into place upon completion of an adhesive fill.

Additively manufacturing the AM inlet port can comprise additively manufacturing the inlet port to comprise an AM inlet adhesive valve. The AM inlet adhesive valve can be configured to facilitate the unidirectional adhesive flow from the AM inlet port to the AM outlet port and to impede an adhesive outflow at the AM inlet port.

Additively manufacturing the AM inlet port can comprise additively manufacturing a lattice within the AM inlet adhesive valve. The lattice can be configured to facilitate the unidirectional adhesive flow from the AM inlet port to the AM outlet port and to impede an adhesive outflow at the AM inlet port.

Additively manufacturing the AM inlet port to comprise an AM inlet adhesive valve can comprise additively manufacturing a plurality of inlet spring loaded tangs. The inlet spring loaded tangs can be configured to couple with an adhesive effector, to facilitate the unidirectional adhesive flow from the AM inlet port to the AM outlet port when coupled with the adhesive effector, and to impede the adhesive outflow at the AM inlet port when decoupled from the adhesive effector.

Additively manufacturing the AM inlet port to comprise an AM inlet adhesive valve can comprise additively manufacturing a flap. The flap can be configured to facilitate the unidirectional adhesive flow from the AM inlet port to the AM outlet port when the adhesive is applied at the inlet port and to impede the adhesive outflow at the AM inlet port by blocking the inlet port when the adhesive is removed from the inlet port. The flap can be configured to lock into place upon completion of an adhesive fill.

In another aspect a method of applying an adhesive to an apparatus comprising an AM inlet port and an AM outlet port comprises: providing an adhesive at the AM inlet port; facilitating an adhesive flow from the AM inlet port to the AM outlet port using an AM valve; and terminating the adhesive flow.

The AM outlet port can comprise the AM valve.

The method of applying an adhesive can further comprise impeding an adhesive outflow at the AM outlet port.

The AM valve can comprise a lattice.

Facilitating an adhesive flow from the AM inlet port to the AM outlet port can further comprise: providing a vacuum at the AM outlet port; and orienting the lattice to facilitate the adhesive flow from the AM inlet port to the AM outlet port using the AM valve.

Terminating the adhesive flow can comprise: measuring a pressure increase indicative of the adhesive reaching the lattice; and terminating the adhesive flow in response to the pressure increase.

The AM valve can comprise a plurality of spring loaded AM tangs.

Facilitating an adhesive flow from the AM inlet port to the AM outlet port can further comprise: coupling a vacuum effector with the plurality of spring loaded AM tangs; and drawing a vacuum with the vacuum effector.

Terminating the adhesive flow can comprise removing the vacuum effector when the adhesive reaches the AM outlet port.

The AM valve can comprise an AM gap region and an AM ball.

Facilitating an adhesive flow from the AM inlet port to the AM outlet port can comprise passing air through the gap region.

Terminating the adhesive flow can comprise blocking the gap region when the adhesive reaches the gap region.

The AM valve can comprise an AM spring positioned to provide support to the AM ball.

The AM valve can comprise a flap.

Facilitating an adhesive flow from the AM inlet port to the AM outlet port can comprise deflecting the flap to allow movement of air over the flap.

Terminating the adhesive flow can comprises blocking the outlet port with the flap when the adhesive reaches the outlet port.

The AM inlet port can comprise the AM valve.

The method of applying an adhesive can further comprise impeding an adhesive outflow at the AM inlet port.

The AM valve can comprise a lattice.

Facilitating an adhesive flow from the AM inlet port to the AM outlet port can comprises orienting the lattice to facilitate the adhesive flow from the AM inlet port to the AM outlet port using the AM valve.

The AM valve can comprise a plurality of spring loaded AM tangs.

Providing an adhesive at the AM inlet port can comprise coupling an adhesive effector with the plurality of spring loaded AM tangs.

Terminating the adhesive flow can comprise removing the adhesive effector when the adhesive reaches the AM outlet port.

The AM valve can comprise a flap.

Facilitating an adhesive flow from the AM inlet port to the AM outlet port can comprise deflecting the flap to pass adhesive over the flap.

Terminating the adhesive flow can comprise blocking the inlet port with the flap when the adhesive reaches the outlet port.

It will be understood that other aspects of additively manufacturing adhesive inlet and outlet ports will become readily apparent to those skilled in the art from the following detailed description, wherein it is shown and described only several embodiments by way of illustration. As will be appreciated by those skilled in the art, the additively manufactured inlet and outlet ports can be realized with other embodiments without departing from the invention. Accordingly, the drawings and detailed description are to be regarded as illustrative in nature and not as restrictive.

BRIEF DESCRIPTION OF THE DRAWINGS

Various aspects of apparatus and methods for additively manufacturing adhesive inlet and outlet ports will now be presented in the detailed description by way of example, and not by way of limitation, in the accompanying drawings, wherein.

DETAILED DESCRIPTION

Figure 1A:
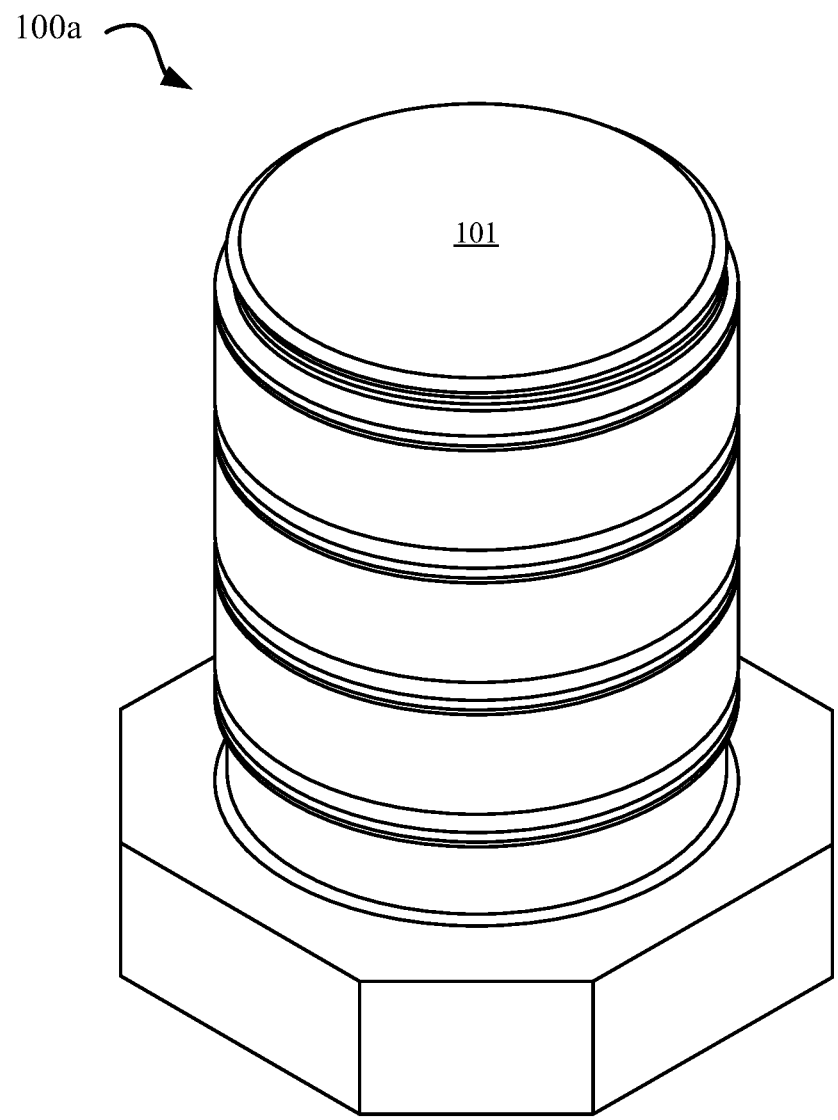
FIG. 1A illustrates a top perspective view of an additively manufactured (AM) part prepared for adhesive sealing according to the teachings herein.

The detailed description set forth below in connection with the drawings is intended to provide a description of exemplary embodiments of technology relating to additively manufactured adhesive inlet and outlet ports, and it is not intended to represent the only embodiments in which the invention may be practiced. The term "exemplary" used throughout this disclosure means "serving as an example, instance, or illustration," and should not necessarily be construed as preferred or advantageous over other embodiments presented in this disclosure. The detailed description includes specific details for the purpose of providing a thorough and complete disclosure that fully conveys the scope of the invention to those skilled in the art. However, the invention may be practiced without these specific details. In some instances, well-known structures and components may be shown in block diagram form, or omitted entirely, in order to avoid obscuring the various concepts presented throughout this disclosure.

The use of additive manufacturing in the context of inlet and outlet ports provides significant flexibility and cost saving benefits that enable manufacturers of mechanical structures and mechanized assemblies to manufacture parts and components with complex geometries at a lower cost to the consumer. The AM inlet and outlet ports described in the foregoing may be used in one or more steps in the process for connecting additively manufactured parts and/or commercial off the shelf (COTS) components. Additively manufactured (AM) parts are printed three-dimensional (3D) parts that are printed by adding layer upon layer of a material based on a preprogrammed design. The parts described in the foregoing may be parts used to assemble a transport structure such as an automobile. However, those skilled in the art will appreciate that the manufactured parts may be used to assemble other complex mechanical products such as vehicles, trucks, trains, motorcycles, boats, aircraft, and the like without departing from the scope of the invention.

Additive manufacturing provides the ability to create complex structures within a part. For example, a node is a structural member that may include one or more interfaces used to connect to other spanning components such as tubes, extrusions, panels, and the like. Using additive manufacturing, a node may be constructed to include additional features and functions, depending on the objectives. For example, a node may be printed with one or more inlet and outlet ports that enable the ability to secure two or more components by injecting an adhesive rather than traditional welding.

During adhesive injection, one or more AM part (component) regions are evacuated and hermetically sealed when a vacuum is drawn through channels connecting the inlet and outlet ports. By first evacuating a channel with a vacuum or negative pressure source, a hermetic seal is formed along a channel path. Once the path is completely evacuated, adhesive is injected, and one or more O-rings can ensure that the adhesive hermetically seals the channel and connected channel regions. After the adhesive is cured and a bond forms between the components, O-rings can advantageously maintain the hermetic seal.

Although the process of drawing a vacuum and applying an adhesive can offer an alternative to conventional welding, adhesive joining does present several challenges. For instance, adhesive may leak out of an inlet and/or outlet port prior to the curing process. This can occur due to backflow following the removal of an adhesive injector at an adhesive inlet port. Also, there can be adhesive leakage upon removal of a vacuum at an outlet part. Unfortunately, backflow and leakage can degrade the adhesive bond quality by introducing air bubbles. Accordingly, there is a need to improve the technology relating to inlet and outlet ports and to develop more effective adhesive injectors to overcome the problems associated with adhesive joining.

Apparatus and methods for additively manufacturing adhesive inlet and outlet ports are presented herein. Adhesive inlet and outlet ports are additively manufactured to include additively manufactured (AM) valves for reducing and/or eliminating sealant leakage and backflow. Robot end effectors are tailored to interface with the AM inlet and outlet ports and to provide an adhesive source and/or a vacuum source. AM inlet and outlet ports enable robust, lightweight, multi-material AM parts connected via adhesive joining.

FIG. 1A illustrates a top perspective view 100a of an additively manufactured (AM) part 101 prepared for adhesive sealing according to the teachings herein. The AM part 101 can be a node prepared for joining with other AM parts. For instance, the part 101 can join with tubes, panels, and/or other nodes using adhesive sealing.

Figure 1B:
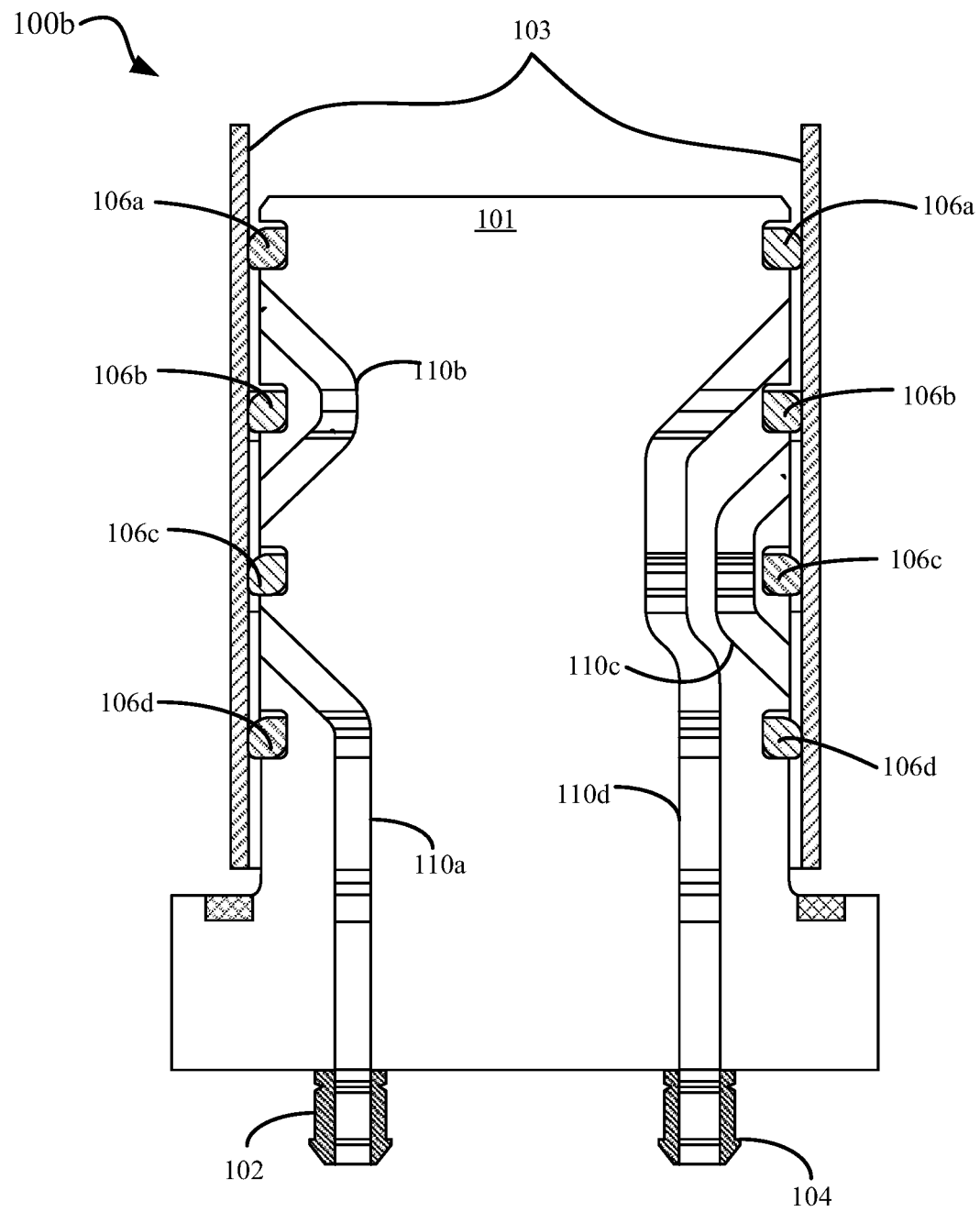
FIG. 1B illustrates a cross section view of the AM part of FIG. 1A using inlet and outlet ports according to a first embodiment.

FIG. 1B illustrates a cross section view 100b of the AM part 101 of FIG. 1A using an inlet port 102 and an outlet port 104 according to a first embodiment. The cross section view 100b further illustrates a second component 103 fitted along the outside of the AM part 101. O-rings 106a-d are fitted between the AM part 101 and the second component 103 to improve component sealing.

A vacuum can be applied to the outlet port 104 and an adhesive (sealant) can be applied at the inlet port 102. The vacuum can draw the sealant through adhesive channels 110a-d so as to fill regions between the AM part 101 and the second component 103. Once the adhesive travels to all regions within the adhesive channels 110a-d and within chambers between the AM part 101 and second component 103, the adhesive can be cured to provide a secure connection.

According to the teachings herein, the inlet port 102 and the outlet port 104 can use AM valves for reducing and/or eliminating sealant leakage and backflow.

Figure 1C:
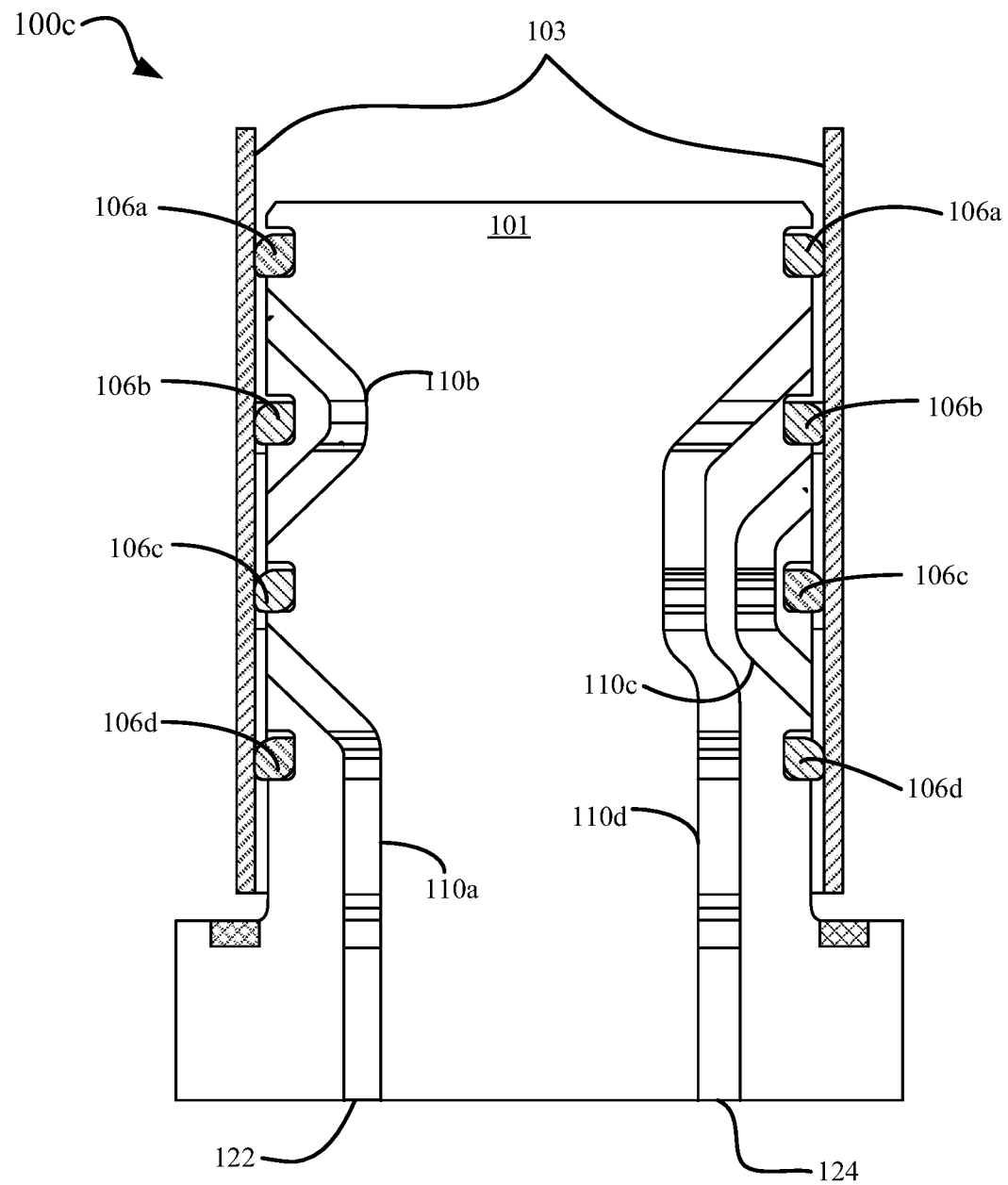
FIG. 1C illustrates a cross section view of the AM part of FIG. 1A using inlet and outlet ports according to a second embodiment.

Although the first embodiment of FIG. 1B shows the inlet port 102 and the outlet port 104 as protruding from AM part 101, other port configurations are possible. For instance, FIG. 1C illustrates a cross section view 100c of the AM part of FIG. 1A using a recessed inlet port 122 and a recessed outlet port 124 according to a second embodiment. Also, although the embodiments shown in cross section views of 100b-c show the AM part 101 are having one inlet port (e.g. inlet port 102 or 122) and one outlet port (e.g. outlet port 104 or 124), other configurations having greater or fewer ports are possible. For instance, an AM part may have more than one inlet port and/or more than one outlet port. In other embodiments, an AM part may use one inlet port to inject adhesive without using a vacuum at an outlet port.

Figure 2A:
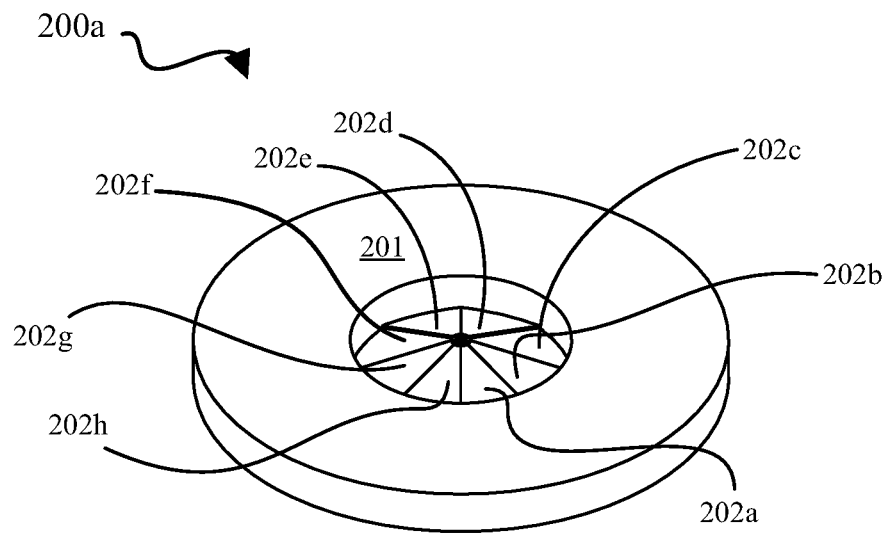
FIG. 2A illustrates a top perspective view of an AM component with a port using spring-loaded tangs according to an embodiment.
Figure 2B:
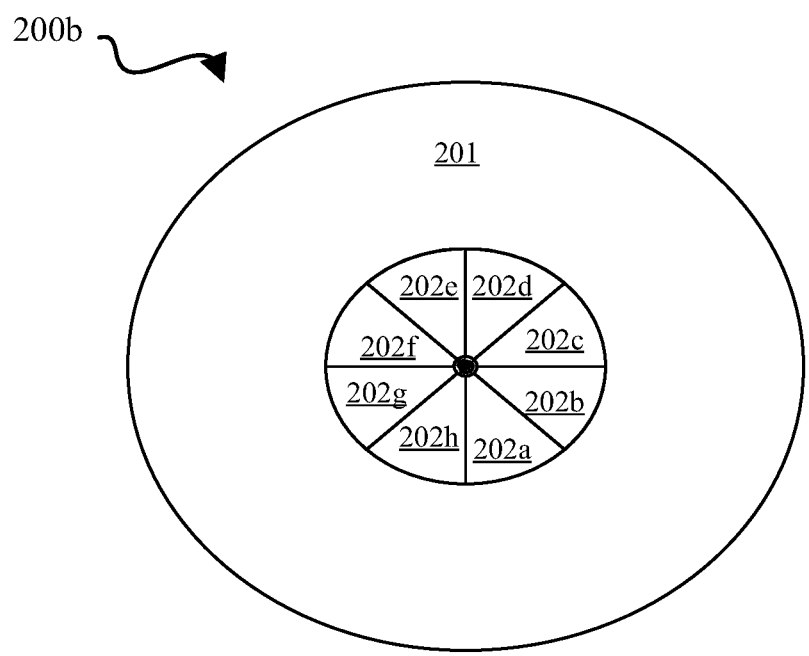
FIG. 2B illustrates a top view of the AM component with the port of FIG. 2A.

FIG. 2A illustrates a top perspective view 200a of an AM component 201 with a port using spring-loaded tangs 202a-h according to an embodiment; and FIG. 2B illustrates a top view 200b of the AM component 201 with the port of FIG. 2A. The spring-loaded tangs 202a-h can be co-printed with the AM component 201 to function as an inlet port valve and/or as an outlet port valve.

Figure 2C:
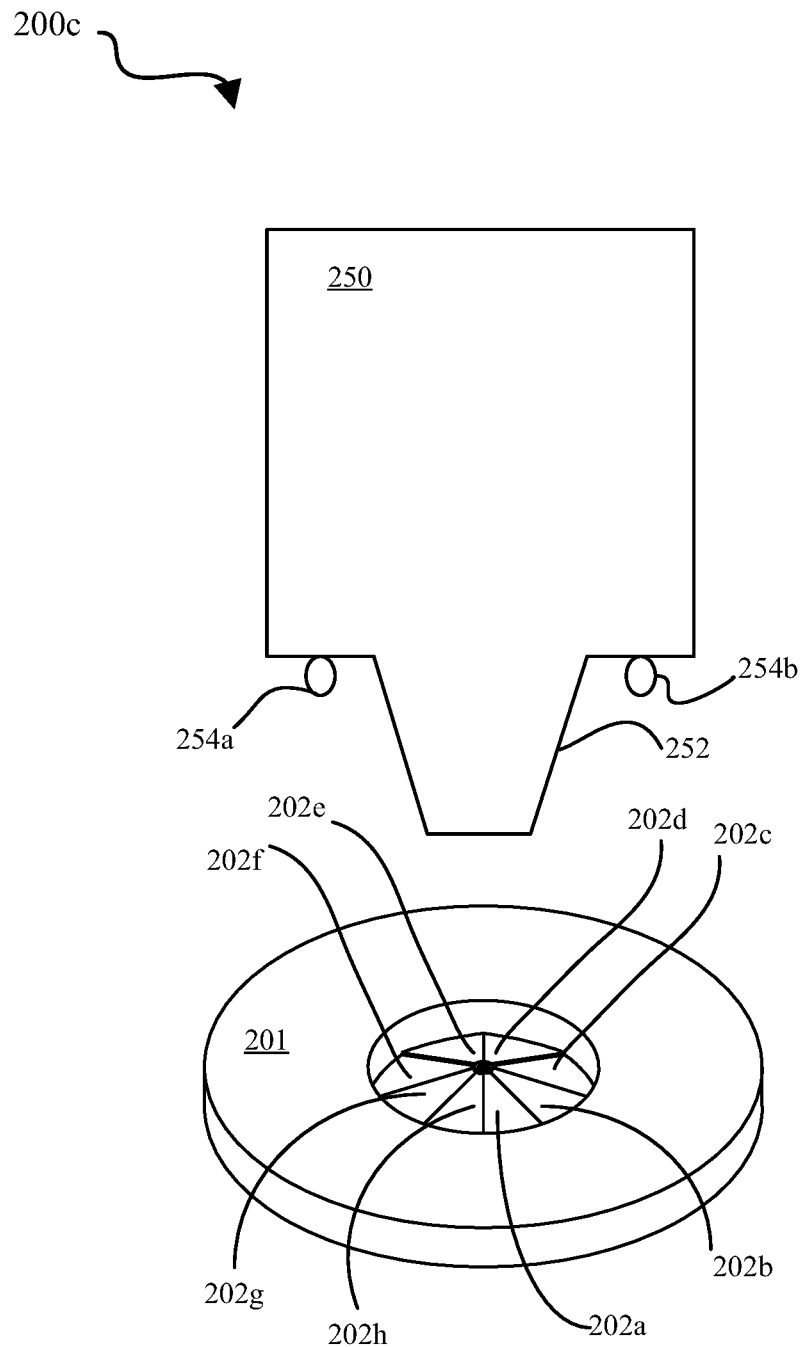
FIG. 2C illustrates a top perspective view of a robot head positioned for interfacing at the port of FIG. 2A.
Figure 2D:
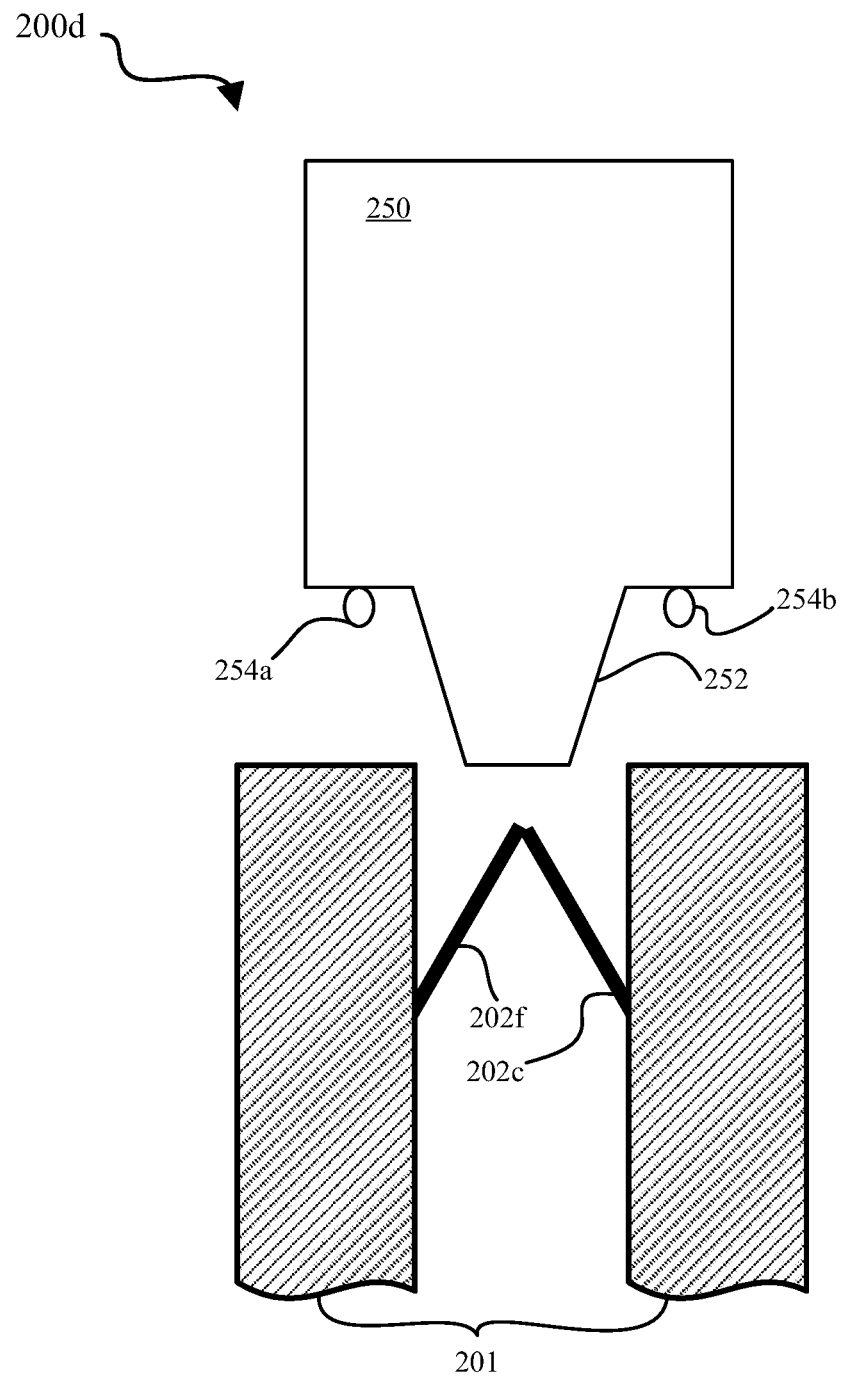
FIG. 2D illustrates a cross section view of the robot head and the port of FIG. 2C.

FIG. 2C illustrates a top perspective view 200c of a robot head 250 positioned for interfacing at the port of FIG. 2A; and FIG. 2D illustrates a cross section view 200d of the robot head 250 and the port of FIG. 2C. The robot head includes an end effector 252 and alignment O-rings 254a-b for interfacing with the port of AM component 201. The end effector 252 can displace and open the spring-loaded tangs 202a-h by pushing them downward.

When the port is an input adhesive port, then the end effector 252 can be an adhesive injection effector functioning as a nozzle to displace the tangs 202a-h downward. The effector can inject an adhesive through the port. When the port is an outlet port, the end effector 252 can be configured for drawing a vacuum.

Figure 2E:
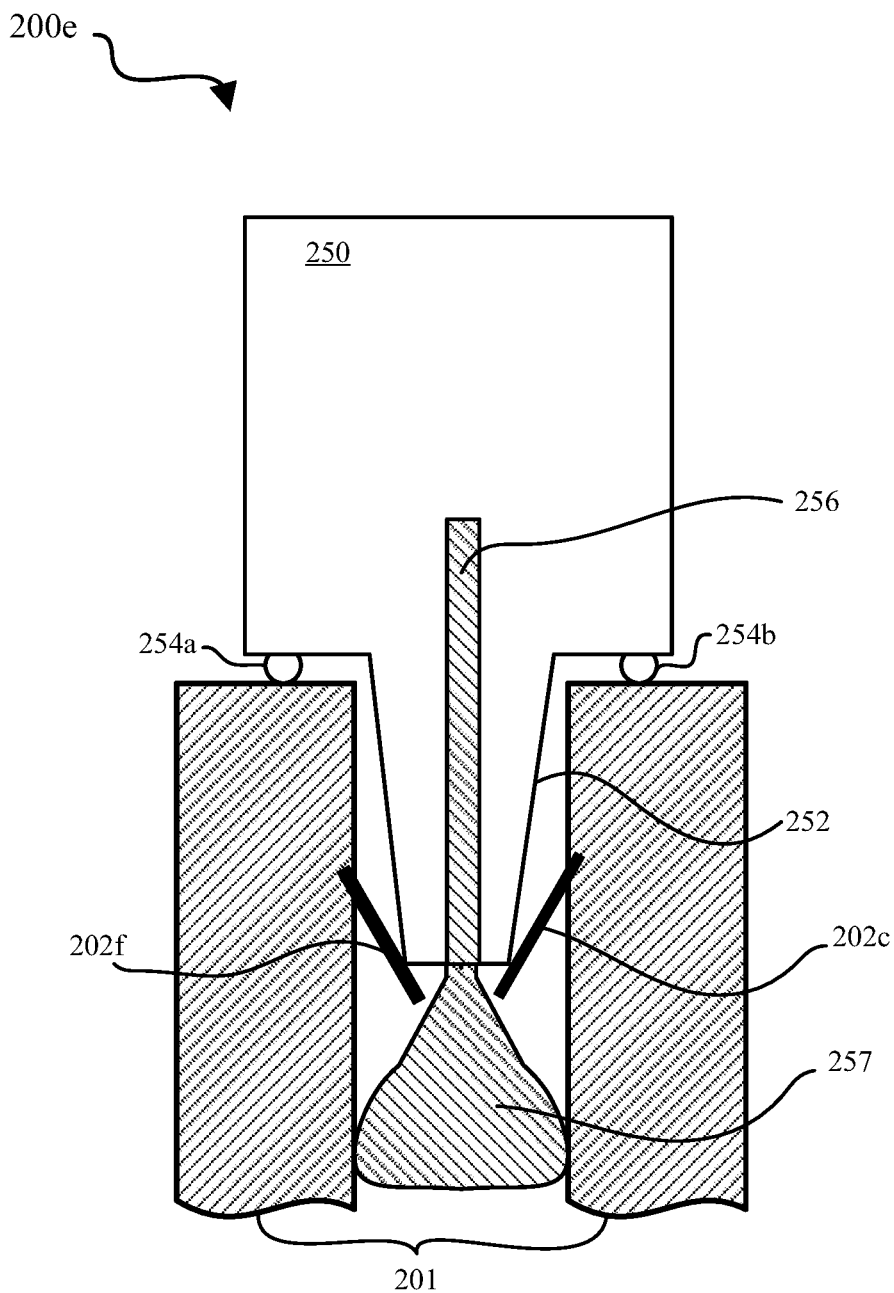
FIG. 2E illustrates a cross section view of the robot head interfaced with the port of the AM component according to an embodiment.

FIG. 2E illustrates a cross section view 200e of the robot head 250 interfaced with the port of the AM component 201 according to an embodiment. In the embodiment of FIG. 2E, the port is an adhesive inlet port and the end effector 252 is configured for injecting adhesive 257 through an adhesive conduit 256. For purposes of illustration, the cross section view 200e depicts the robot end effector 252 as displacing the tangs 292f and 202c. Although not shown in the cross section view 200e, the robot end effector 252 can displace all spring loaded tangs 202a-h in order to open the port of the AM component 201. The alignment O-rings 254a-b contact the AM component 201 to enhance the seal and ensure the fidelity of the adhesive injection.

Figure 2F:
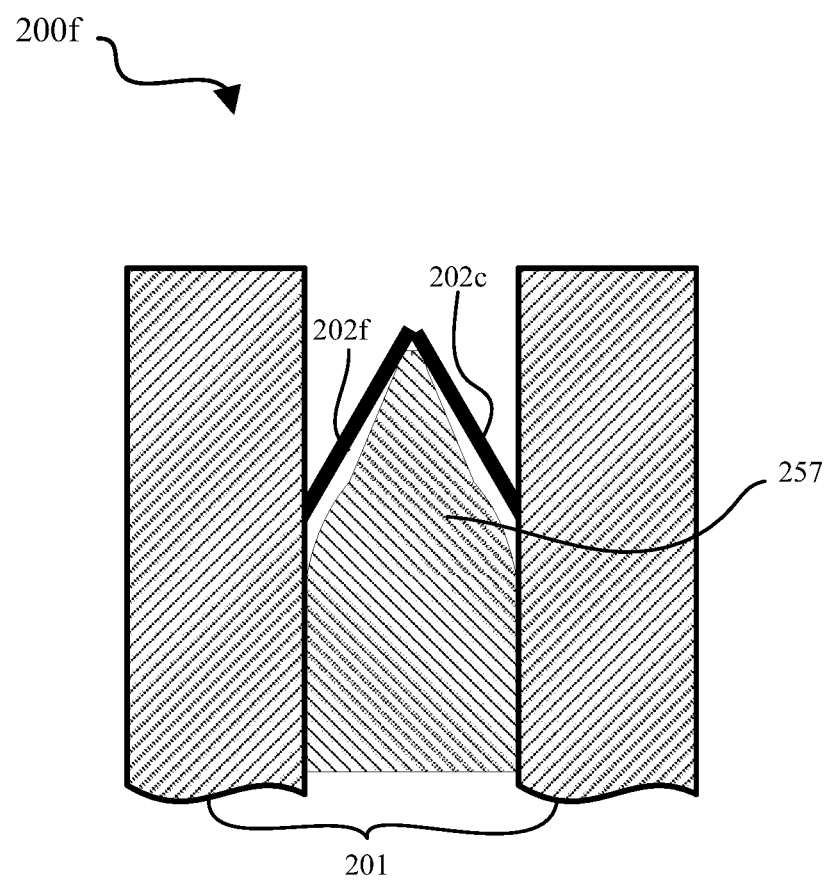
FIG. 2F illustrates a cross section view of the port of the AM component after completion of adhesive injection.

FIG. 2F illustrates a cross section view 200f of the port of the AM component 201 after completion of adhesive injection. As shown, upon completion of the fill, the end effector 252 is removed and the tangs 202c and 202f snap back in place to seal the port and contain adhesive 257.

Figure 3A:
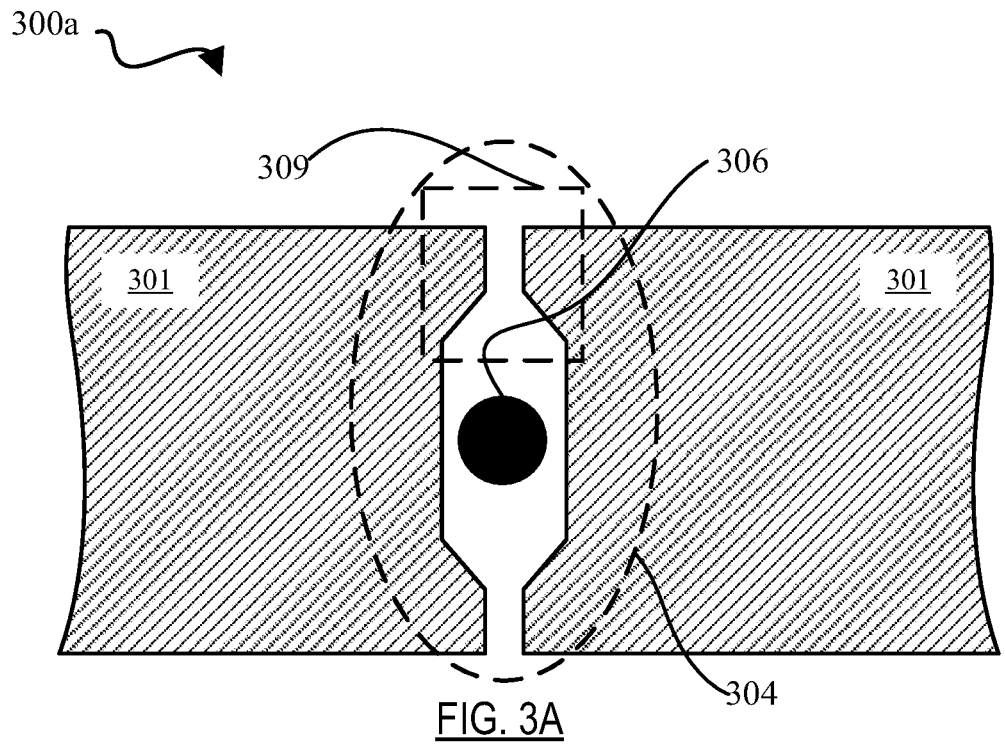
FIG. 3A illustrates a cross section view of an AM component with an outlet port using a co-printed ball valve according to an embodiment.
Figure 3B:
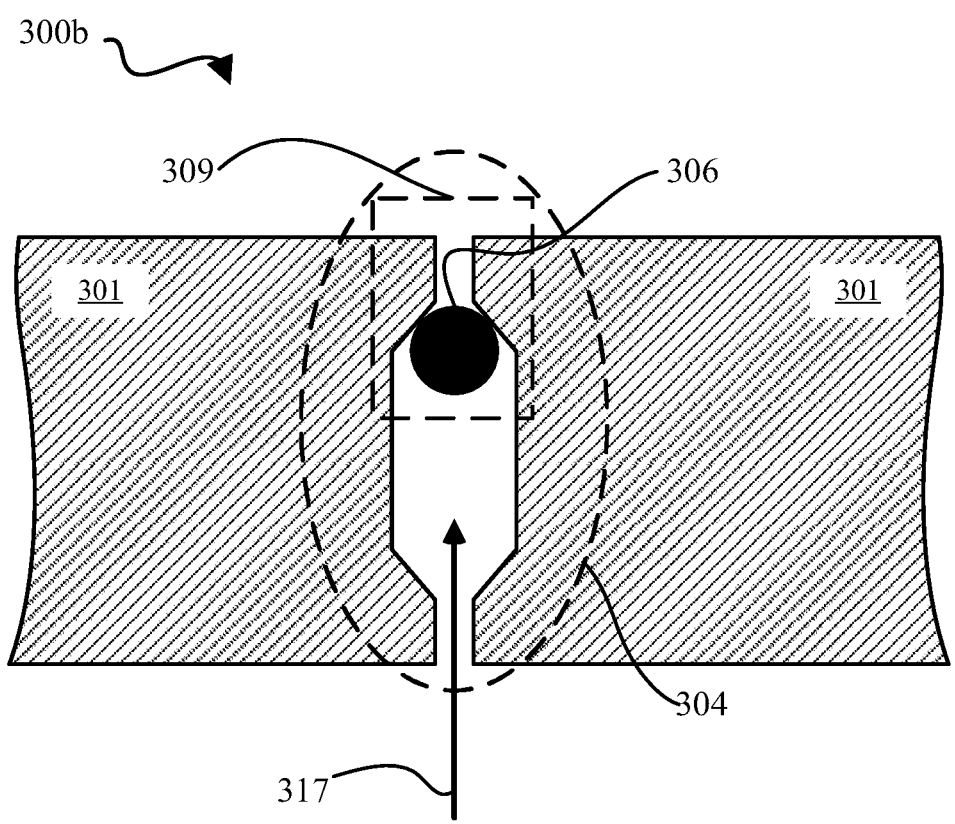
FIG. 3B illustrates the AM outlet port of FIG. 3A after completion of adhesive injection.

FIG. 3A illustrates a cross section view 300a of an AM component 301 with an outlet port using a co-printed ball valve 304 according to an embodiment; and FIG. 3B illustrates the outlet port of FIG. 3A after completion of adhesive injection. The outlet port can be a vacuum port where a vacuum is provided to draw adhesive toward the outlet port in the direction of vector 317; and the ball 306 can be co-printed within the ball valve 304.

When the vacuum is provided, the ball 306 can be displaced so as to allow air passage around the ball. An adhesive may be injected through a conventional port and/or an AM inlet port. The adhesive can flow through adhesive channels within the AM component 301 and be drawn toward the co-printed ball valve 304. As soon as adhesive reaches and flows into the ball valve 304 it can lock the ball 306 into the region 309 as shown in FIG. 3B. In this way the co-printed ball valve realizes a sealed vacuum tight adhesive connection.

Figure 4:
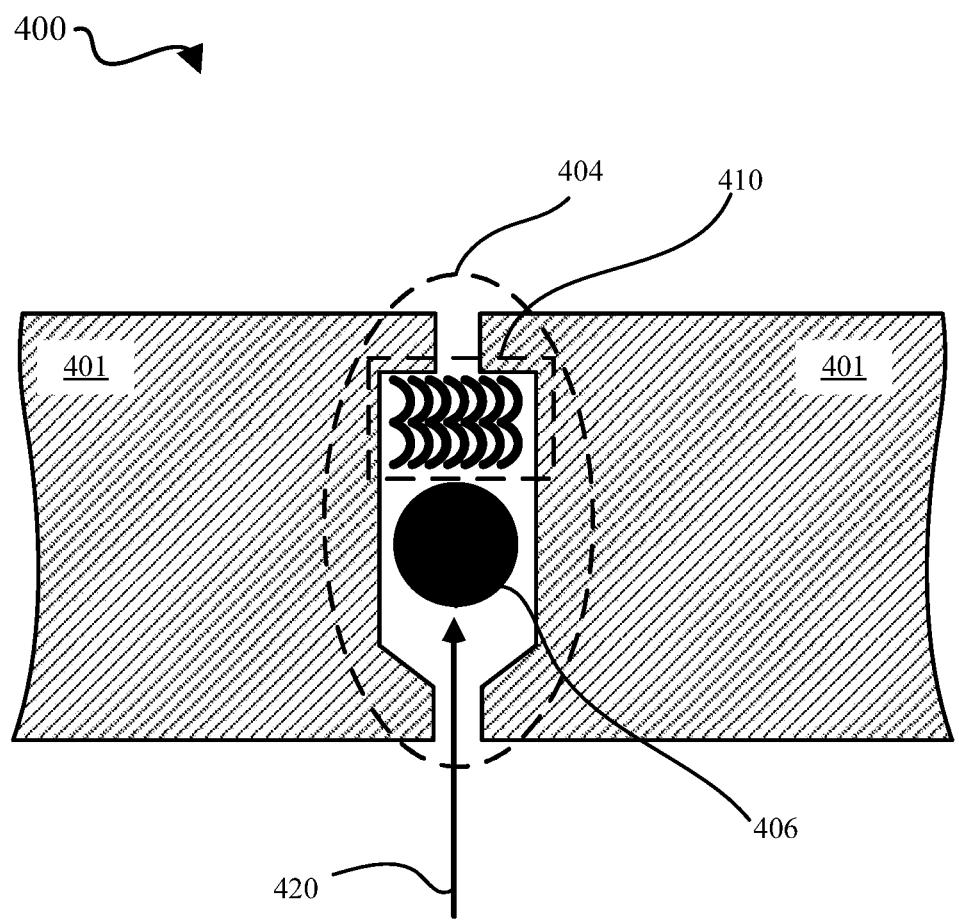
FIG. 4 illustrates a cross section view of an AM component using an AM outlet port co-printed with a ball valve and AM springs according to an embodiment.

FIG. 4 illustrates a cross section view 400 of an AM component 401 using an outlet port co-printed with a ball valve 404 and AM springs 410 according to an embodiment. The ball valve 404 is similar to ball valve 304 except it uses AM springs 410 which are added at an opening to lock the ball 406. The AM springs 410 can either be co-printed, or added after printing the AM component 401. The AM springs 410 can ensure that the ball 406 does not block the outlet port prematurely, thereby allowing airflow around the ball 406 through the AM springs 410.

The AM springs 410 can be printed to have a mesh size and geometrical features which impede the flow of adhesive. The air and adhesive flow, shown by vector 420, continues until adhesive reaches and fills the ball valve 404. The adhesive injection pressure may then lock the ball 406 and the AM springs 410 into place, thereby sealing the ball valve 404 and advantageously preventing adhesive spillage due to the impeding action of the AM springs 410.

Figure 5A:
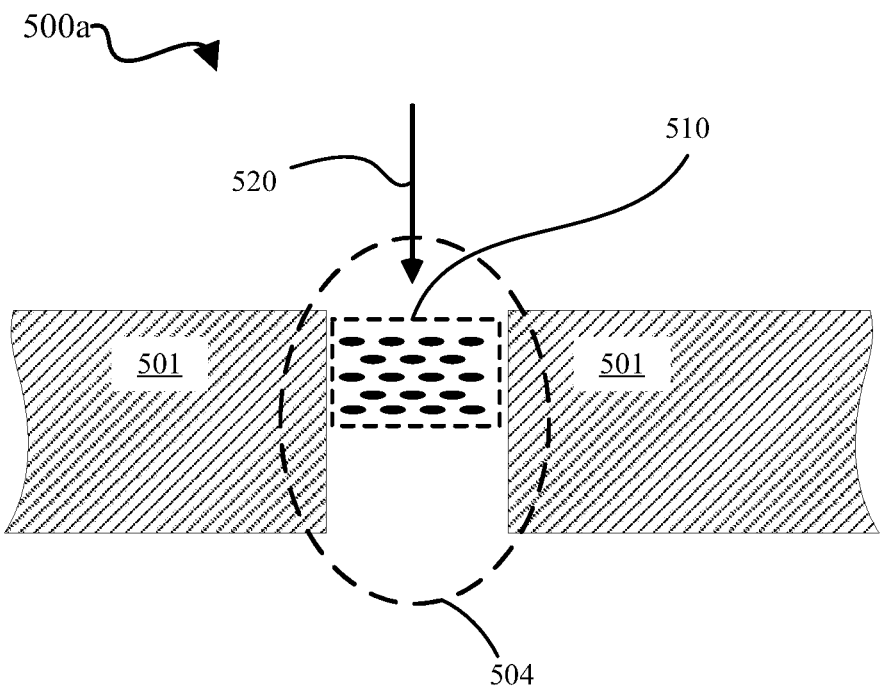
FIG. 5A illustrates a cross section view of an AM component using an AM inlet port valve co-printed with a lattice according to an embodiment.

FIG. 5A illustrates a cross section view 500a of an AM component 501 using an AM inlet port valve 504 co-printed with a lattice 510 according to an embodiment. The co-printed lattice 510 can be co-printed with an orientation and geometry so as to ensure unidirectional flow. The lattice 510 can be co-printed so as to facilitate flow in the adhesive inflow direction shown by vector 520 while impeding flow opposite to vector 520. In this way adhesive can flow into the AM component 501 and opposite backflow can be reduced and/or eliminated.

Figure 5B:
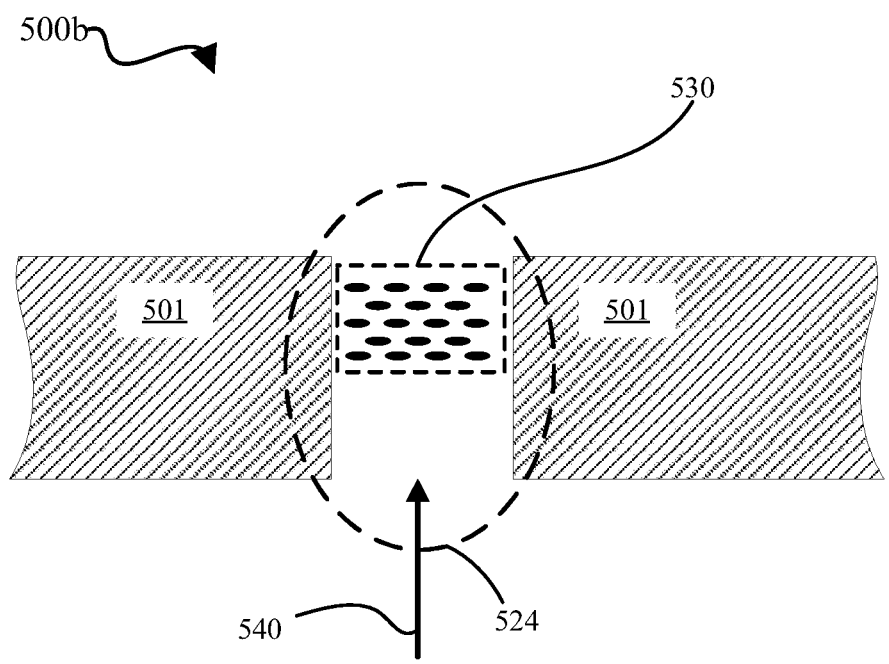
FIG. 5B illustrates a cross section view of the AM component using an AM outlet port valve co-printed with a lattice according to an embodiment.

FIG. 5B illustrates a cross section view 500b of the AM component 501 using an AM outlet port valve 524 co-printed with a lattice 530 according to an embodiment. The embodiment of FIG. 5B is similar to that of FIG. 5A, except the lattice 530 is oriented so as to impede adhesive flow as the adhesive enters the outlet port valve 524 along the flow vector 540. The lattice 530 can be co-printed to provide a reduced volume for flow.

A pressure spike resulting from the adhesive flow at the lattice 530 can be used in automating adhesive injection into the AM component 501. For instance, the resulting pressure spike can be used as a signal to a control module to send instructions for terminating adhesive injection. In this way the lattice 530 can advantageously operate as a flow sensor which senses, via pressure spikes, when to terminate injection. Additionally, the lattice 530 can advantageously prevent adhesive leakage out of the AM component 501.

Figure 6A:
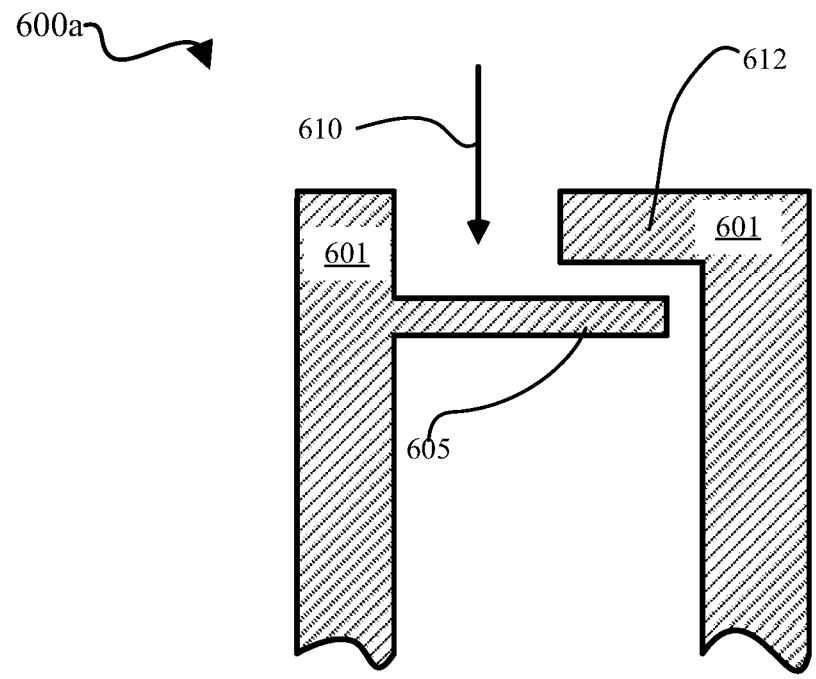
FIG. 6A illustrates a cross section view of an AM component using a co-printed flap as an inlet port valve according to an embodiment.

FIG. 6A illustrates a cross section view 600a of an AM component 601 using a co-printed flap 605 as an inlet port valve according to an embodiment. The co-printed flap 605 with the extension 612 can function as a valve to ensure unidirectional flow in the direction of flow vector 610. The flap 605 can be configured to deflect away from the extension 612 during adhesive injection, and can prevent flow of the adhesive in the direction opposite to the flow vector 610. Flow is prevented and/or impeded in the opposite direction when the flap 605 pushes against the extension 612 to prevent flow.

Figure 6B:
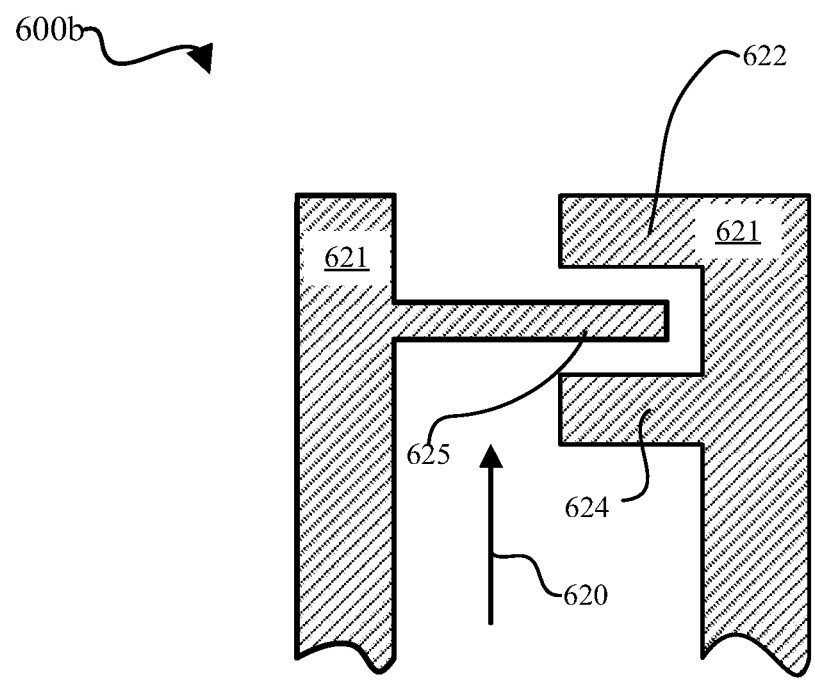
FIG. 6B illustrates a cross section view of an AM component using a co-printed flap as an outlet port valve according to an embodiment.

FIG. 6B illustrates a cross section view 600b of an AM component 621 using a co-printed flap 625 as an outlet port valve according to an embodiment. In this embodiment the flap 625 functions similar to flap 605 except the flow direction is in the direction of flow vector 620. The outlet port valve includes a first extension 622 and a second extension 624 which facilitate vacuum air flow in the direction of the flow vector 620 while impeding adhesive flow in the direction of flow vector 620. Thus, once the adhesive reaches the output port valve and the AM part 621 is completely filled, the valve can lock into place and prevent outflow.

Figure 7A:
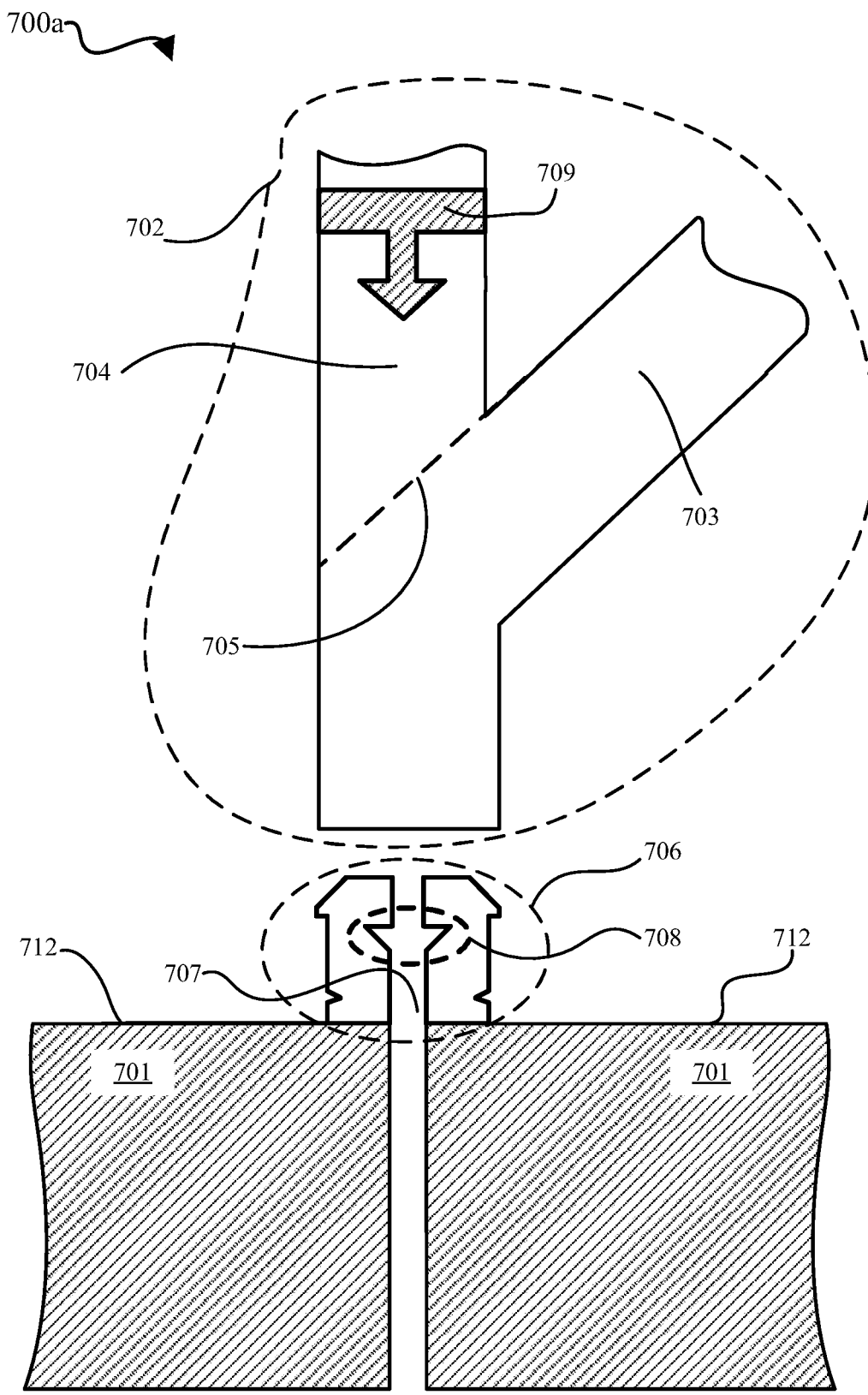
FIG. 7A illustrates a cross section view of a multifunctional end effector positioned for connection with an AM port.

FIG. 7A illustrates a cross section view 700a of a multifunctional end effector 702 positioned for connection with an AM port 706. The AM port 706 extends from the surface 712 of the AM part 701 and can serve as an inlet port for injecting adhesive and/or as a vacuum port for drawing an adhesive via the vacuum.

When used for adhesive injection at the AM port 706, the multifunctional end effector 702 can provide at least two functions: adhesive injection, and post injection plugging. As shown in FIG. 7A, post injection plugging can be effected through a first channel 704 holding a plug 709; and adhesive injection can be effected through a second channel 703. During adhesive injection, adhesive flows through the second channel 703 and into the AM port 706 through a channel 707. Upon completion of the fill, a section 708 of the AM port 706 is additively manufactured and available as a plug acceptor feature to receive and hold the plug 709. For example, the plug 709 may be snapped into place at section 708 when the fill is completed. A partition 705 can be used to route the adhesive injected through the second channel 703 into the AM port 706.

Figure 7B:
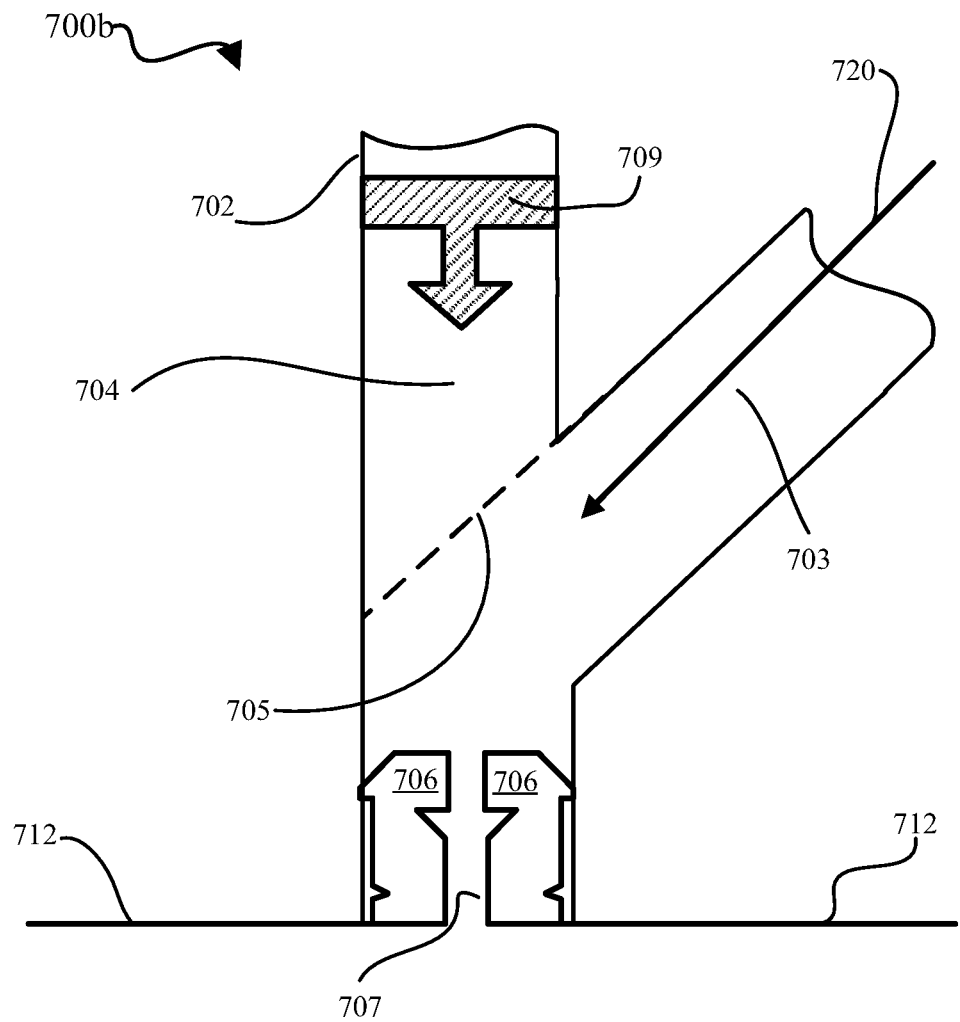
FIG. 7B illustrates a cross section view of the multifunctional end effector of FIG. 7A connected with the AM port for adhesive injection.

FIG. 7B illustrates a cross section view 700b of the multifunctional end effector 702 of FIG. 7A connected with the AM port 706 for adhesive injection. As shown in FIG. 7B, the multifunctional end effector 702 fits over the AM port 706 and can contact the surface 712. Adhesive flows along flow vector 720 and into the AM port 706.

Figure 7C:
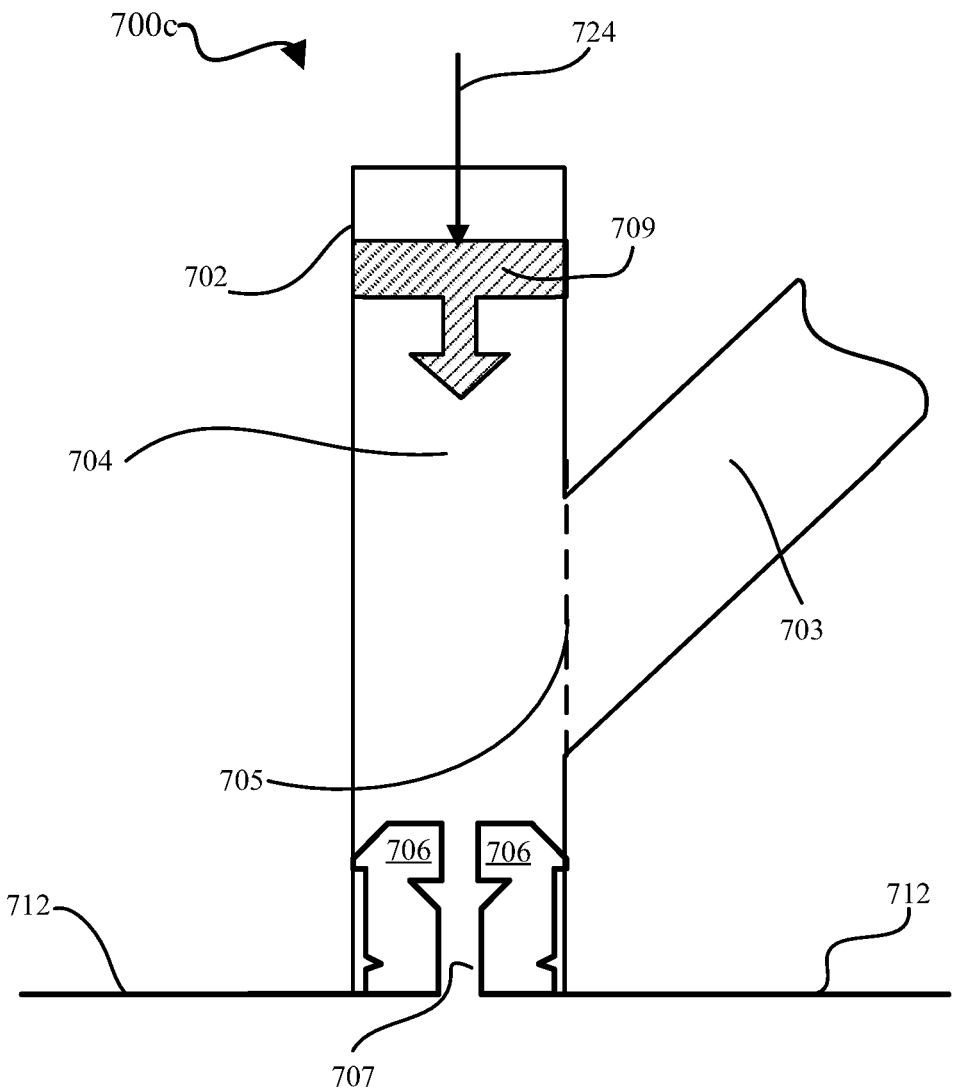
FIG. 7C illustrates a cross section view of the multifunctional end effector of FIG. 7A connected with the AM port for sealing.

FIG. 7C illustrates a cross section view 700c of the multifunctional end effector 702 of FIG. 7A. On completion of the adhesive fill, the partition 705 blocks the second channel 703; and the plug 709 is inserted from the first channel 704 in the direction of vector 724.

Figure 7D:
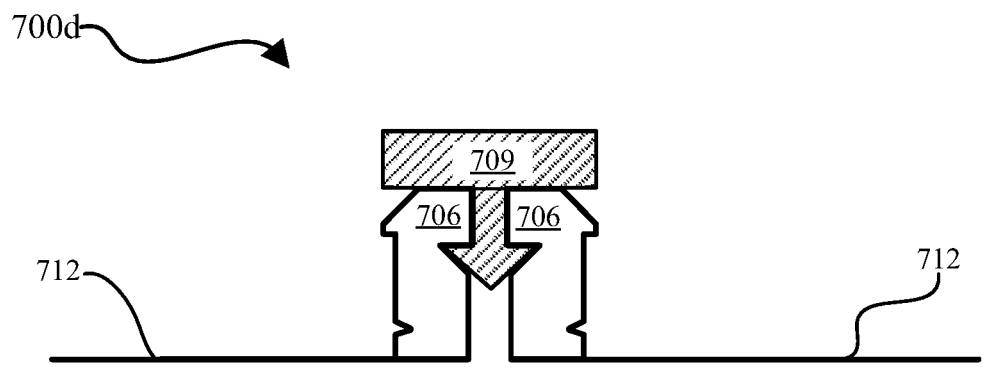
FIG. 7D illustrates a cross section view of the AM port following the adhesive injection and sealing by the multifunctional end effector of FIG. 7A.

FIG. 7D illustrates a cross section view 700d of the AM port 706 following the adhesive injection and sealing by the multifunctional end effector of FIG. 7A. The plug 709 snaps into place at the co-printed plug acceptor region 708 (FIG. 7A). Using the multifunctional end effector 704 can advantageously reduce and/or eliminate the need for pressure equalization. This in turn can reduce air gulping, a phenomenon which occurs when conventional injection effectors are disconnected.

In some embodiments the AM port 706 can be an outlet port for operating as a conventional vacuum port. In other embodiments the AM port 706 can be co-printed with mesh, a pop-in element, or another structure designed to ease the process flow.

Figure 8:
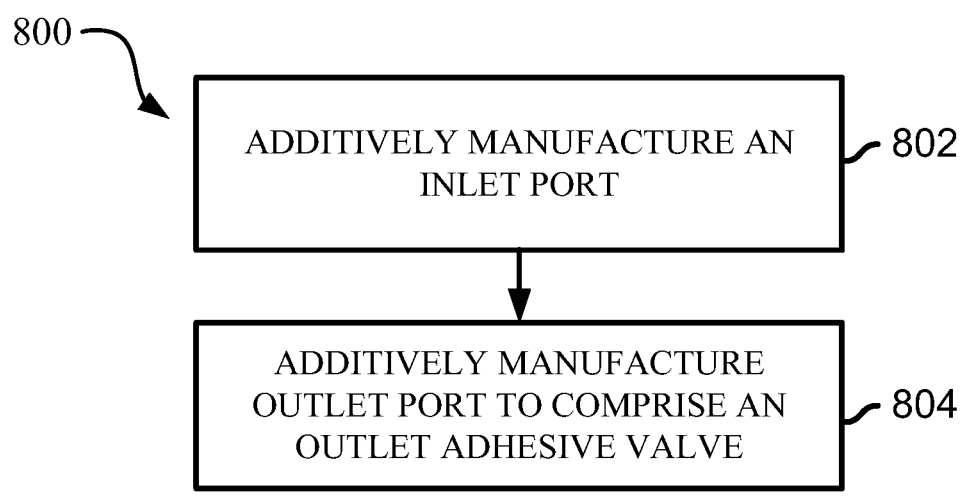
FIG. 8 illustrates a conceptual flow diagram for additively manufacturing an AM node according to the teachings herein.

FIG. 8 illustrates a conceptual flow diagram 800 for additively manufacturing an AM node according to the teachings herein. In step 802 an inlet port is additively manufactured; and in step 804 an outlet port is additively manufactured with an outlet adhesive valve. The outlet adhesive valve can comprise the AM outlet port valve features presented above. For instance, the AM outlet valve can be a ball valve or use co-printed tangs. In some embodiments the inlet port can also include a co-printed inlet valve as discussed in FIGS. 1A-7D.

Figure 9:
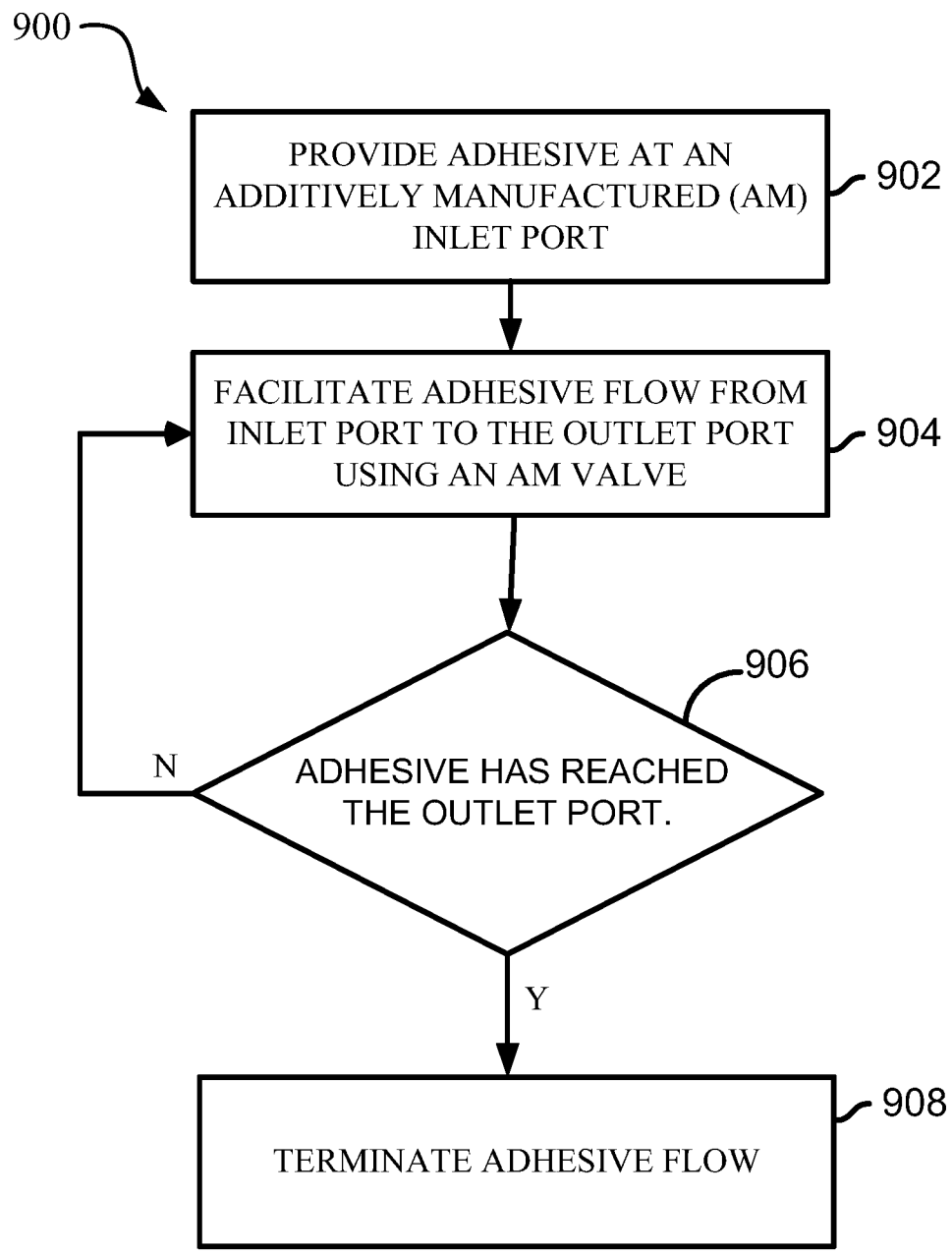
FIG. 9 illustrates a conceptual flow diagram for applying an adhesive to an AM part comprising AM inlet and outlet ports.

FIG. 9 illustrates a conceptual flow diagram 900 for applying an adhesive to an AM part comprising AM inlet and outlet ports. The AM part can comprise any of the AM components/parts having both AM inlet and outlet ports as described above. In step 902 an adhesive is provided at an AM inlet port. In step 904 adhesive flow is facilitated from the inlet port to the outlet port using an AM port valve. In this step a vacuum can optionally be attached to an outlet port. An AM inlet port valve and/or an AM outlet port valve may be used in the inlet and outlet ports, respectively. For instance, the co-printed ball valve of FIGS. 3A-B may be used to facilitate unidirectional flow. Step 906 is a decision step to determine if the adhesive flow is complete. If the flow is not complete, then the flow diagram returns to step 904 and adhesive continues to flow. In order to determine if the flow is complete a pressure sensor such as lattice 530 can be used in a control system to determine when to exit the decision step. If the adhesive flow is complete and adhesive has reached the outlet port, then the flow diagram terminates adhesive flow at step 908, e.g., as described in the embodiments of FIGS. 7C-D, above.

Figure 10:
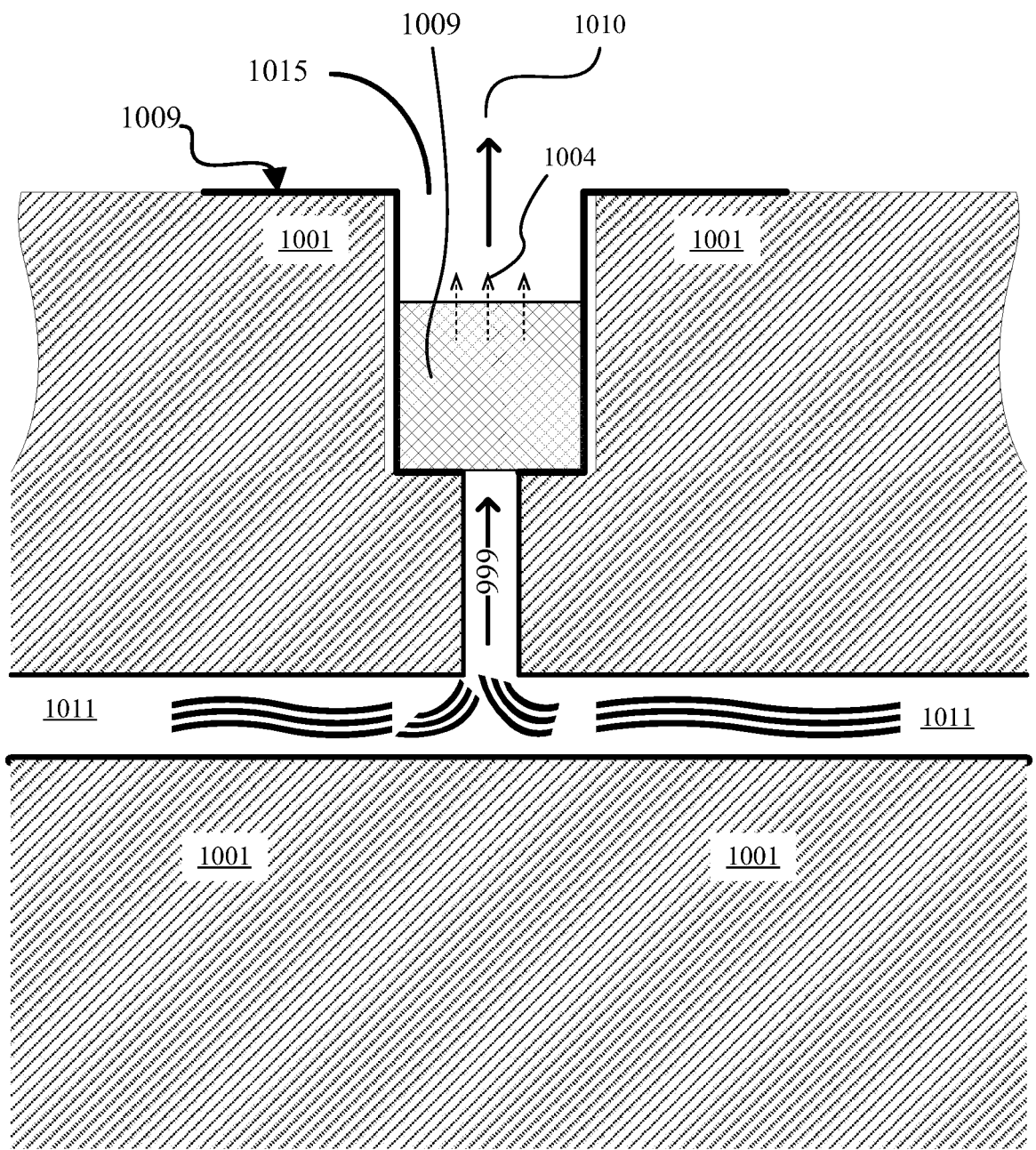
FIG. 10 illustrates a cross section view of an outlet port with a pop-in element installed inside.

FIG. 10 illustrates a cross section view of an adhesive outlet port 1015 with a pop-in element 1009 installed inside outlet port 1015 of the AM component 1001. In this embodiment, the pop-in element 1009 may be utilized to determine when the AM component 1001 has reached the adhesive full point. The pop-in element 1009 may be made of a material such as an elastomer. The element 1009 would be configured to pop into the adhesive outlet port 1015 by the application of some pressure, which action may temporarily disfigure the pop-in element. The element 1009 would have sufficient elasticity to spring back to its original dimensions after it has been popped into the adhesive outlet port. The diameter (or opening profile) of the adhesive outlet port 1015 may in an embodiment be smaller than the pop-in element 1009 in its original shape, such that pop-in element 1009 may effectively captured in the port 1015.

In operation, the pop-in element 1009 would be a mesh-like or restrictor element. In this capacity, the element 1009 would allow for air to be drawn through it. However, when an adhesive 999 flows through it from inner channels 1011 as it is attracted to the vacuum (or solely is pushed by a force from the adhesive inlet port, where no vacuum is applied), a restricted flow 1004 indicative of a sudden pressure change or pressure spike would be produced. This restricted flow 1004 may be recorded during the adhesive injection process and would indicate a complete fill. The adhesive injection apparatus would then be disconnected. Depending on the elasticity of the pop-in element 1009 and other characteristics, the pressure building from the restricted flow 1004 may result in a sufficient upward pressure on the element 1009 to selectively disfigures it or, in some embodiments, lodges it out of place. The restricted flow 1004 is intended to conceptually convey that a sudden change of pressure in the direction of arrow 1010 can be observed at the outlet port by virtue of the pop-in element 1009. It does not necessarily mean that the restricted flow will resemble the illustration exactly.

The previous description is provided to enable any person skilled in the art to practice the various aspects described herein. Various modifications to these exemplary embodiments presented throughout this disclosure will be readily apparent to those skilled in the art, and the concepts disclosed herein may be applied to other techniques for additively manufacturing adhesive inlet and outlet ports. Thus, the claims are not intended to be limited to the exemplary embodiments presented throughout the disclosure, but are to be accorded the full scope consistent with the language claims. All structural and functional equivalents to the elements of the exemplary embodiments described throughout this disclosure that are known or later come to be known to those of ordinary skill in the art are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f), or analogous law in applicable jurisdictions, unless the element is expressly recited using the phrase "means for" or, in the case of a method claim, the element is recited using the phrase "step for."

What is claimed is:

1. An apparatus comprising:
   a body;
   an additively manufactured (AM) inlet port configured to receive an adhesive;
   an AM outlet port comprising an AM outlet adhesive valve configured to impede an adhesive outflow at the AM outlet port; and
   a channel connecting the inlet and outlet ports for enabling the adhesive to fill a desired region in the body,
   wherein the AM outlet adhesive valve comprises a lattice distributed across an area of the AM outlet port internal to and near an outer surface of the body,
   wherein the lattice comprises a flow sensor configured to sense a pressure spike at the lattice caused by an accumulation of adhesive in the desired region and to thereby prevent adhesive leakage.

2. The apparatus of claim 1, wherein the adhesive flow is unidirectional from the AM inlet port to the AM outlet port.

3. The apparatus of claim 1,
   wherein the AM outlet port is configured to receive a vacuum; and
   wherein the AM outlet adhesive valve is configured to facilitate the adhesive flow from the AM inlet port to the AM outlet port by engaging the vacuum.

4. The apparatus of claim 3, wherein the lattice is configured to:
   engage the vacuum by passing air; and
   impede the adhesive outflow at the AM outlet port when the fill is complete.

5. The apparatus of claim 4, wherein the AM outlet adhesive valve comprises a plurality of outlet spring loaded tangs configured to:
   couple with a vacuum effector;
   facilitate the vacuum when coupled with the vacuum effector; and
   impede the adhesive outflow at the AM outlet port when decoupled from the vacuum effector.

6. The apparatus of claim 1, wherein the AM inlet port comprises an AM inlet adhesive valve configured to:
   facilitate the adhesive flow from the AM inlet port to the AM outlet port; and
   impede an adhesive outflow at the AM inlet port.

7. The apparatus of claim 6, wherein the AM inlet adhesive valve comprises a lattice configured to impede the adhesive outflow at the AM inlet port.

8. The apparatus of claim 6, wherein the AM inlet adhesive valve comprises a plurality of inlet spring loaded tangs configured to:
   couple with an adhesive effector;
   facilitate the adhesive flow from the AM inlet port to the AM outlet port when coupled with the adhesive effector; and
   impede the adhesive outflow at the AM inlet port when decoupled from the adhesive effector.

9. The apparatus of claim 6, wherein the AM inlet adhesive valve comprises a flap configured to:
   facilitate the adhesive flow from the AM inlet port to the AM outlet port when the adhesive is applied at the inlet port; and
   impede the adhesive outflow at the AM inlet port by blocking the inlet port when the adhesive is removed from the inlet port.

10. The apparatus of claim 9, wherein the flap is configured to lock into place upon completion of an adhesive fill within the apparatus.

11. The apparatus of claim 1, wherein the flow sensor is configured to send a signal to a control module to terminate the filling in response to sensing the pressure spike.

12. The apparatus of claim 1, wherein the pressure spike from the adhesive flow is configured to automate adhesive injection.

13. The apparatus of claim 1, wherein the lattice is co-printed with an orientation and geometry to reduce leakage to the outer surface.

14. The apparatus of claim 1, where elements of the lattice are positioned evenly across the AM outlet port in rows.

* * * * *